(12) United States Patent
Fujita et al.

(10) Patent No.: US 6,552,118 B2
(45) Date of Patent: *Apr. 22, 2003

(54) CURABLE ADHESIVE COMPOSITION

(75) Inventors: Masayuki Fujita, Kobe (JP); Masato Kusakabe, Takasago (JP); Kenichi Kitano, Kobe (JP)

(73) Assignee: Kaneka Corporation, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/463,652
(22) PCT Filed: Jul. 28, 1998
(86) PCT No.: PCT/JP98/03348
 § 371 (c)(1),
 (2), (4) Date: Apr. 14, 2000
(87) PCT Pub. No.: WO99/05215
 PCT Pub. Date: Feb. 4, 1999

(65) Prior Publication Data
 US 2002/0086942 A1 Jul. 4, 2002

(30) Foreign Application Priority Data

Jul. 28, 1997 (JP) .............................. 9-201106
Aug. 1, 1997 (JP) .............................. 9-207440
Aug. 1, 1997 (JP) .............................. 9-207441
Aug. 1, 1997 (JP) .............................. 9-207442

(51) Int. Cl.$^7$ ...................... C08L 83/10; C09J 123/26; C09J 143/04
(52) U.S. Cl. .............. 524/588; 106/287.1; 106/287.12; 106/287.16; 525/100; 525/101; 525/104; 525/106; 525/342; 528/33; 427/367; 156/329; 524/904
(58) Field of Search ................................ 525/100, 101, 525/104, 106, 342; 528/33; 106/287.1, 287.12, 287.16; 156/329; 427/387; 524/588, 904

(56) References Cited

U.S. PATENT DOCUMENTS

| | | | |
|---|---|---|---|
| 4,191,713 A | * 3/1980 | Yonezawa et al. | 525/102 |
| 4,334,036 A | * 6/1982 | Yonezawa et al. | 525/102 |
| 4,657,978 A | * 4/1987 | Wakabayashi et al. | 525/100 |
| 4,714,738 A | * 12/1987 | Chang et al. | 525/58 |
| 4,735,829 A | * 4/1988 | Hirose et al. | 427/387 |
| 4,831,080 A | 5/1989 | Blizzard et al. | |
| 5,115,014 A | * 5/1992 | Wakabayashi et al. | 524/506 |
| 5,290,847 A | * 3/1994 | Yukimoto et al. | 524/506 |
| 5,763,548 A | 6/1998 | Matyjaszewski et al. | 526/135 |
| 5,789,487 A | 8/1998 | Matyjaszewski et al. | 525/301 |
| 5,807,937 A | 9/1998 | Matyjaszewski et al. | 526/135 |
| 5,840,800 A | * 11/1998 | Joffre et al. | 524/806 |
| 5,852,129 A | * 12/1998 | Kusakabe et al. | 525/330.3 |
| 5,986,014 A | * 11/1999 | Kusakabe et al. | 525/342 |

FOREIGN PATENT DOCUMENTS

| | | |
|---|---|---|
| EP | 0049155 A2 | 4/1982 |
| EP | 0196645 A2 | 10/1986 |
| EP | 0205827 A2 | 12/1986 |
| EP | 0757059 A1 | 2/1997 |
| EP | 0789036 A2 | 8/1997 |
| EP | 0845479 A2 | 6/1998 |
| WO | WO 96/30421 | 10/1996 |
| WO | WO 97/18247 | 5/1997 |

OTHER PUBLICATIONS

Database WPI, Section Ch, Week 1999534, Derwent Publications Ltd., London, GB; Class A18, AN 1995-261301, XP002217147 & JP 07 165817 A (Kanebuchi Kagaku Kogyo KK), Jun. 27, 1995 (Jul. 27, 1995) *abstract*.

* cited by examiner

Primary Examiner—Margaret G. Moore
Assistant Examiner—Jeffrey B. Robertson
(74) Attorney, Agent, or Firm—Connolly Bove Lodge & Hutz LLP

(57) ABSTRACT

An adhesive curable composition which comprises, as the main component, a vinyl polymer having at least one crosslinkable silyl group represented by the general formula (1). Said composition can be used as a sealing composition, a pressure sensitive adhesive composition and a coating composition.

$$-[Si(R^1)_{2-b}(Y)_bO]_m-Si(R^2)_{3-a}(Y)_a \qquad (1)$$

wherein $R^1$ and $R^2$ are the same or different and each represents an alkyl group containing 1 to 20 carbon atoms, an aryl group containing 6 to 20 carbon atoms, an aralkyl group containing 7 to 20 carbon atoms or a triorganosiloxy group represented by the formula $(R')_3SiO-$ (in which R' represents a monovalent hydrocarbon group containing 1 to 20 carbon atoms and the plural R' groups may be the same or different) and, when there are two or more $R^1$ or $R^2$ groups, they may be the same or different; Y represents a hydroxyl group or a hydrolyzable group and, when there are two or more Y groups, they may be the same or different; a represents 0, 1, 2 or 3; b represents 0, 1 or 2; and m represents an integer of 0 to 19; with the condition that a, b and m satisfy the relation $a+mb \geq 1$.

30 Claims, No Drawings

CURABLE ADHESIVE COMPOSITION

TECHNICAL FIELD

The present invention relates to a curable composition which has adhesiveness or stickiness, namely an adhesive curable composition. More particularly, it relates to a sealing composition which shows good weathering resistance and heat resistance, has good handling properties owing to its low viscosity, can be packed in one container and shows good coating properties, and to a coating composition or pressure sensitive adhesive composition which has good weathering resistance and heat resistance in which the solvent content can be markedly reduced (to attain a high solid content) owing to the intrinsic low viscosity of said composition and which is therefore less unfriendly to the environment.

BACKGROUND ART

In the field of building and construction, among others, silicone type sealing materials having a silicon-containing group which has a hydroxyl or hydrolyzable group bound to a silicon atom and can be crosslinked under formation of siloxane bonds (hereinafter referred to also as "crosslinkable silyl group") have so far generally been widely used as sealing compositions excellent in weathering resistance and heat resistance. It is pointed out, however, that silicone-based sealing materials have drawbacks such as poor adhesion of paints and tendency toward staining areas around joints, although they are excellent not only in weathering resistance but also in resistance to movement and cold workability, among others.

Recently, crosslinkable silyl-terminated polyisobutylene-based sealing materials have been proposed as new-type weathering-resistant sealing materials. It is pointed out, however, that polyisobutylene-based sealing materials are high in viscosity, hence poor in workability, and hardly permeable to moisture and therefore difficult to subject to one-component packaging, although they are excellent in weathering resistance and resistance to permeation of moisture.

Vinyl or (meth)acrylic polymers are excellent in weathering resistance and therefore have the possibility of their being useful as base polymers in high weathering resistance sealing materials. In particular, crosslinkable silyl-containing (meth)acrylic polymers are very promising, since they have already been put to practical use in high weathering resistance paint compositions. However, said polymers are generally produced by copolymerizing a crosslinkable silyl-containing (meth)acrylic monomer and another vinyl monomer, so that crosslinkable silyl groups are randomly introduced into molecular chains. Therefore, difficulties arise in using said polymers in those elastic sealing materials which are required to have low modulus and high elongation characteristics. A vinyl or (meth)acrylic polymer, if it has a crosslinkable silyl group terminally to the main chain, would be expected to be utilizable as a new-type weathering-resistant sealing material.

On the other hand, acrylic pressure sensitive adhesives as well as natural rubber-based pressure sensitive adhesives are produced in large quantities, since they have well-balanced adhesive characteristics without the aid of any tackifier resin. Since, however, acrylic pressure sensitive adhesives are disadvantageously poor in cohesion owing to their molecular weight and molecular weight distribution, it is usual to subject them to crosslinking for cohesion improvement. For such crosslinking, various techniques have been developed. For example, methods have been proposed which comprise adding a crosslinking agent such as a polyisocyanate compound, epoxy compound, polybasic carboxylic acid, polyamine compound, phenolic resin, or sulfur compound, for instance; or carrying out crosslinking of crosslinkable silyl-containing acrylic polymers in the presence of a condensation catalyst. In particular, pressure sensitive adhesives comprising a crosslinkable silyl-containing acrylic polymer as the main component are advantageous in that they are cured by crosslinking via siloxane bonding and therefore are excellent in weathering resistance.

However, even those pressure sensitive adhesives in which a crosslinkable silyl-containing (meth)acrylic polymer is used have crosslinkable silyl groups randomly introduced therein, so that, when a low-molecular polymer is used to attain a reduced viscosity, the distance between crosslinking sites becomes short. In that case, the problem is that elastic properties required of pressure sensitive adhesives cannot be obtained. For providing pressure sensitive adhesives with elastic properties, a method is available which comprises using a high-molecular polymer as the above polymer and reducing the amount of the crosslinkable silyl-containing monomer to thereby increase the distance between crosslinking sites. However, the use of a high-molecular polymer as the above polymer leads to a high viscosity or solid state and, therefore, for using the resulting polymer as a pressure sensitive adhesive, it is necessary to use a solvent in fairly large amounts to reduce the viscosity. In the case of such a solvent type pressure sensitive adhesive, the solvent is evaporated after application of the pressure sensitive adhesive to a film or like substrate. For this, a lot of heat energy is required and, in addition, the solvent may cause a fire or adversely affect the human body. It is therefore required that no solvent be used or a high solid content be attained. The use of a high-molecular polymer as the above polymer thus has its limits.

To solve the above problem, it has been proposed that a (meth)acrylic copolymer which meets the relatively low molecular weight and low viscosity requirements and has a crosslinkable silyl group introduced therein terminally to the main chain be used as the base polymer in pressure sensitive adhesive compositions.

Crosslinking silyl-containing vinyl or (meth)acrylic polymers are also used as base polymers in high weathering resistance solvent or water paint compositions since, when cured by crosslinking in the presence of an appropriate condensation catalyst, they give coat films excellent in weathering resistance.

As a result of the recent increasing interest in the earth environment, the use of solvent paints which evaporate a large amounts of solvents is rather refrained but it is demanded that paint compositions have a still higher solid content. For achieving a high solid content in vinyl or (meth)acrylic paints while securing the spreadability in the coating step, it is generally necessary to reduce the viscosity and, therefore, to reduce the molecular weight of the polymer. However, when the molecular weight is reduced, a problem arises, namely the weathering resistance intrinsic in vinyl or (meth)acrylic polymers is lost.

As a method of solving this problem, a method is presumable which comprises reducing the molecular weight distribution, namely the ratio (Mw/Mn) of weight average molecular weight (Mw) to number average molecular weight (Mn), of a vinyl or (meth)acrylic polymer, as determined by gel permeation chromatography, to thereby reduce the polymer viscosity and thus attain a high solid content. However, those vinyl or (meth)acrylic polymers which are used in paint compositions are generally produced by free radical polymerization, so that only those polymers which have a wide molecular weight distribution (generally having an Mw/Mn value of not less than 2) can be obtained.

Further, the reduction in molecular weight for attaining a low viscosity results in a shortened distance between sites of crosslinking, which in return leads to formation, in the step of curing, of coat films with a very high crosslinking density. As a result, the coat films obtained are very poor in elastic properties and the problem that said films may not follow the deformation of substrates will arise. One means to solve this problem is to use a vinyl or (meth)acrylic polymer having a crosslinkable silyl group terminally to the main chain as the main component. The crosslinkable silyl-terminated main chain makes it possible to increase the distance between crosslinking sites while maintaining an adequate molecular weight and, as a result, to provide the resulting coat films with elastic properties.

As mentioned hereinabove, it is necessary, for obtaining low-viscosity sealing compositions, pressure sensitive adhesive compositions and paint compositions without decreasing physical properties, to obtain a vinyl or (meth)acrylic polymer having a crosslinkable silyl-terminated main chain and a narrow molecular weight distribution. It is not easy to produce such a polymer by the prior art technology.

As an attempt to synthesize such a polymer having a crosslinkable silyl-terminated main chain, a method is disclosed in Japanese Kokoku Publication Hei-3-14068, for example, which comprises polymerizing a (meth)acrylic monomer in the presence of a crosslinkable silyl-containing mercaptan, a crosslinkable silyl-containing disulfide and a crosslinkable silyl-containing radical polymerization initiator. Further, in Japanese Kokoku Publication Hei-04-55444, a method is disclosed which comprises polymerizing an acrylic monomer in the presence of a crosslinkable silyl-containing hydrosilane compound or a tetrahalosilane. It is difficult by these methods, however, to introduce the crosslinkable silyl group into the polymer at both termini with sureness. Thus, an insufficient gel fraction, hence insufficient curability, will result.

Further, Japanese Kokai Publication Hei-6-211922 discloses a room temperature-curable composition which comprises a crosslinkable silyl-terminated (meth)acrylic polymer obtained by synthesizing a hydroxyl-terminated acrylic polymer by using a hydroxyl-containing polysulfide in excess relative to an initiator, followed by conversion of the hydroxyl group. This synthetic method makes it possible to obtain a (meth)acrylic polymer with a relatively high percentage of terminal crosslinkable silyl groups but requires the use of a large amount of an expensive hydroxyl-containing polysulfide, which is a chain transfer agent. This is a problem from the production process viewpoint. Another problem is that the viscosity of the polymer becomes high since the molecular weight distribution becomes wide.

Accordingly, in view of the foregoing, the present invention has for its object to produce an adhesive curable composition excellent in weathering resistance and heat resistance and having a low viscosity by using, as the main component, a vinyl polymer having at least one crosslinkable silyl group.

SUMMARY OF THE INVENTION

The invention thus provides an adhesive curable composition which comprises, as the main component, a vinyl polymer having at least one crosslinkable silyl group represented by the following general formula (1):

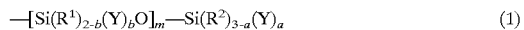

$$—[Si(R^1)_{2-b}(Y)_bO]_m—Si(R^2)_{3-a}(Y)_a \qquad (1)$$

wherein $R^1$ and $R^2$ are the same or different and each represents an alkyl group containing 1 to 20 carbon atoms, an aryl group containing 6 to 20 carbon atoms, an aralkyl group containing 7 to 20 carbon atoms or a triorganosiloxy group represented by the formula $(R')_3SiO—$ (in which R' represents a monovalent hydrocarbon group containing 1 to 20 carbon atoms and the plural R' groups may be the same or different) and, when there are two or more $R^1$ or $R^2$ groups, they may be the same or different; Y represents a hydroxyl group or a hydrolyzable group and, when there are two or more Y groups, they may be the same or different; a represents 0, 1, 2 or 3; b represents 0, 1 or 2; and m represents an integer of 0 to 19; with the condition that a, b and m satisfy the relation $a+mb \geq 1$.

DETAILED DESCRIPTION OF THE INVENTION

The adhesive curable resin composition of the present invention comprises a vinyl polymer having at least one crosslinkable silyl group represented by the above general formula (1).

In the above general formula (1), $R^1$ and $R^2$ are the same or different and each represents an alkyl group containing 1 to 20 carbon atoms, an aryl group containing 6 to 20 carbon atoms, an aralkyl group containing 7 to 20 carbon atoms or a triorganosiloxy group represented by the formula $(R')_3SiO—$ (in which R' represents a monovalent hydrocarbon group containing 1 to 20 carbon atoms and the plural R' groups may be the same or different). When there are two or more $R^1$ or $R^2$ groups, they may be the same or different.

In the above general formula (1), Y represents a hydroxyl group or a hydrolyzable group. When there are two or more Y groups, they may be the same or different.

Said hydrolyzable group is not particularly restricted but includes, among others, a hydrogen atom, a halogen atom and alkoxyl, acyloxyl, ketoximato, amino, amido, aminoxyl, mercapto, alkenyloxyl and like groups. Among them, alkoxyl groups are preferred because of mild hydrolyzability and ease of handling.

In the above general formula (1), a represents 0, 1, 2 or 3, and b represents 0, 1 or 2. m represents an integer of 0 to 19. The total number of hydroxyl and hydrolyzable groups, namely a+mb, is an integer not less than 1. Thus, at least one Y is contained in the above general formula (1).

The number of silicon atoms constituting the above crosslinkable silyl group may be 1 or 2 or more. When the silicon atoms are joined together via siloxane bonding, said number may be up to about 20.

Vinyl monomers constituting the main chain of the above vinyl monomer having at least one crosslinkable silyl group are not particularly restricted. As an example, there can be mentioned, any of (meth)acrylic acid type monomers such as (meth)acrylic acid, methyl (meth)acrylate, ethyl (meth) acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth) acrylate, cyclohexyl (meth)acrylate, n-heptyl (meth) acrylate, n-octyl (meth)acrylate, 2-ethylhexyl (meth) acrylate, nonyl (meth)acrylate, decyl (meth) acrylate, dodecyl (meth)acrylate, phenyl (meth)acrylate, tolyl (meth) acrylate, benzyl (meth)acrylate, 2-methoxyethyl (meth)

acrylate, 3-methoxypropyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxypropyl) trimethoxysilane, (meth)acrylic acid-ethylene oxide adduct, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth) acrylate, 2-perfluoromethyl-2-perfluoroethylmethyl (meth) acrylate, 2-perfluorohexylethyl (meth)acrylate, 2-perfluorodecylethyl (meth)acrylate, 2-perfluorohexadecylethyl (meth)acrylate, etc.; styrene type monomers such as styrene, vinyltoluene, α-methylstyrene, chlorostyrene, styrenesulfonic acid and salts thereof, etc.; fluorine-containing vinyl monomers such as perfluoroethylene, perfluoropropylene, vinylidene fluoride, etc.; silicon-containing vinyl monomers such as vinyltrimethoxysilane, vinyltriethoxysilane, etc.; maleic anhydride, maleic acid, maleic acid monoalkyl esters and dialkyl esters; fumaric acid, fumaric acid monoalkyl esters and dialkyl esters; maleimide monomers such as maleimide, methylmaleimide, ethylmaleimide, propylmaleimide, butylmaleimide, hexylmaleimide, octyl-maleimide, dodecylmaleimide, stearylmaleimide, phenyl-maleimide, cyclohexylmaleimide, etc.; nitrile-containing vinyl monomers such as acrylonitrile, methacrylonitrile, etc.; amide-containing vinyl monomers such as acrylamide, methacrylamide, etc.; vinyl esters such as vinyl acetate, vinyl propionate, vinyl pivalate, vinyl benzoate, vinyl cinnamate, etc.; alkenes such as ethylene, propylene, etc.; conjugated dienes such as butadiene, isoprene, etc.; vinyl chloride, vinylidene chloride, allyl chloride, and allyl alcohol. Those monomers may be used each independently or a plurality of them may be used.

In the above manner of expression, "(meth)acrylic acid", for instance, means acrylic acid and methacrylic acid.

Preferred as the above vinyl polymer having at least one crosslinkable silyl group from the physical characteristics viewpoint are (meth)acrylic polymers obtained by polymerizing using not less than 40% by weight of a (meth)acrylic monomer among the vinyl monomers specifically mentioned above.

The molecular weight of said vinyl polymer having at least one crosslinkable silyl group is not particularly restricted but is preferably within the range of 500 to 100,000. When the molecular weight is below 500, the characteristics intrinsic in the vinyl polymer are hardly expressed. A molecular weight above 100,000 makes handling difficult.

The molecular weight distribution, namely the ratio (Mw/Mn) of weight average molecular weight (Mw) to number average molecular weight (Mn) as determined by gel permeation chromatography, of said vinyl polymer having at least one crosslinkable silyl group is not particularly restricted but, for suppressing the viscosity of the adhesive curable composition prepared by using said polymer to thereby facilitate handling of said composition and for obtaining cured products having sufficient physical properties, a narrow molecular weight distribution is preferred. Specifically, an Mw/Mn value of less than 1.8 is preferred. Said value is more preferably not more than 1.7, still more preferably not more than 1.6, still more preferably not more than 1.5, in particular not more than 1.4, most preferably not more than 1.3.

The method of synthesizing said vinyl polymer having at least one crosslinkable silyl group is not particularly restricted but various methods may be used. From the viewpoint of versatility concerning monomers and ease of control, however, the method comprising directly introducing a crosslinkable silyl group into the main chain by radical polymerization and the method comprising obtaining a vinyl polymer having a specific functional group convertible to a crosslinkable silyl group by one to several reaction steps and then converting said specific functional group to a crosslinkable silyl group are preferred.

The techniques for radical polymerization to be used in synthesizing the vinyl polymer having a specific functional group, inclusive of a crosslinkable silyl group, may be classified into two groups; one is "ordinary radical polymerization" in which a monomer having a specific functional group and a vinyl monomer are merely copolymerized using an azo compound or a peroxide, for instance, as the polymerization initiator and the other is "controlled radical polymerization" by which it is possible to introduce a specific functional group into the polymer at controlled sites, for example at terminal sites.

"Ordinary radical polymerization" is simple and easy to perform and may also be employed in the practice of the present invention. However, the monomer having a specific functional group can be introduced into the polymer only in a random manner. When a polymer with a high degree of functionalization is to be obtained, it is necessary to use said monomer in a considerably large amount. When the amount of said monomer is small, the problem arises that the increases in the proportion of polymer molecules in which said specific functional group has not been introduced. There is another problem that a wide molecular weight distribution results, hence only a polymer having high viscosity can be obtained.

"Controlled radical polymerization" methods can be further classified into two: one is "chain transfer agent method" which comprises using a chain transfer agent having a specific functional group to thereby obtain a functional group-terminated vinyl polymer, and the other is "living radical polymerization method" by which a polymer having a molecular weight almost as designed can be obtained as a result of growing polymerization termini grow without undergoing termination or like reactions.

The "chain transfer agent method" can give a polymer with a high degree of functionalization and may also be used in the practice of the present invention. However, said method requires a fairly large amount of a chain transfer agent as compared with the initiator and raises economical problems, inclusive of a treatment-related problem. Like the above "ordinary radical polymerization", this method involves free radical polymerization and, therefore, gives only a high viscosity polymer with a wide molecular weight distribution.

Differing from the above polymerization methods, the "living radical polymerization" proceeds at a high rate of polymerization and hardly undergoes termination reactions and gives a polymer with a narrow molecular weight distribution (polymer with an Mw/Mn value of about 1.1 to 1.5) in spite of its being a mode of that radical polymerization which is regarded as difficult to control because of tendency toward occurrence of termination reactions such as radical-to-radical coupling. It is also possible to arbitrarily control the molecular weight by adjusting the monomer/initiator charge ratio.

The "living radical polymerization" method thus can give a low viscosity polymer with a narrow molecular weight distribution and, in addition, allows introduction of the specific functional group-containing monomer into the polymer mostly at the desired sites and, therefore, is preferred as the method of producing the above specific functional group-containing vinyl polymer.

While the term "living polymerization", in its narrower sense, means polymerization in which molecular chains grow while the termini thereof always retain their activity, said term generally includes, within the meaning thereof, quasi-living polymerization in which terminally inactivated molecules and terminally active molecules grow in a state of equilibrium. The latter definition applies to the living polymerization to be employed in the present invention.

Such "living radical polymerization" has recently been studied actively by various groups of researchers. As examples, there may be mentioned, among others, the use of a cobalt-porphyrin complex as described in the Journal of the American Chemical Society, 1994, vol. 116, pages 7943 ff, the use of a radical capping agent such as a nitroxide compound as described in Macromolecules, 1994, vol. 27, pages 7228 ff., and the technique of "atom transfer radical polymerization; ATRP" which uses an organic halide or the like as the initiator and a transition metal complexes as the catalyst.

Among the "living radical polymerization" techniques, the above-mentioned "atom transfer radical polymerization" technique has, in addition to the above-mentioned advantageous features of "living radical polymerization", advantages in that it gives a polymer having a halogen or the like, which is relatively advantageous to functional group conversion, at the main chain termini and that the degree of freedom in initiator and catalyst designing and, therefore, is preferred as the method of producing the above-mentioned specific functional group-containing vinyl polymer.

Said "atom transfer radical polymerization" is carried out using an organic halide or halogenated sulfonyl compound or the like as the initiator and a transition metal complex as the catalyst, and the monomers mentioned above, if necessary together with a solvent and/or the like. This atom transfer radical polymerization is described, for example, by Matyjaszewski et al. in the Journal of the American Chemical Society, 1995, vol. 117, pages 5614 ff.; Macromolecules, 1995, vol. 28, pages 7901 ff.; Science, 1996, vol. 272, pages 866 ff.; WO 96/30421 and WO 97/18247, and by Sawamoto et al. in Macromolecules, 1995, vol. 28, pages 1721 ff.

The organic halide to be used as the initiator in said "atom transfer radical polymerization" is preferably an organic halide having a highly reactive carbon-halogen bond, which specifically includes, among others, carbonyl compounds having a halogen at -position and compounds having a halogen at benzyl-position.

The transition metal catalyst to be used as the catalyst in said "atom transfer radical polymerization" is not particularly restricted but includes, among others, complexes with an element of a group 7, 8, 9, 10 or 11 of the periodic table as the central metal. As preferred examples, there may be mentioned complexes of copper having a valency of 0 (zero), monovalent copper, divalent ruthenium, divalent iron or divalent nickel. Among them, copper complexes are preferred. These may be used singly or two or more of them may be used in combination.

Said monovalent copper compounds are not particularly restricted but includes, among others, cuprous chloride, cuprous bromide, cuprous iodide, cuprous cyanide, cuprous oxide and cuprous perchlorate. When such a copper compound is used, a ligand, such as 2,2'-bipyridyl or a derivative thereof, 1,10-phenanthroline or a derivative thereof, tetramethyl-ethylenediamine, pentamethyldiethylenetriamine, hexamethyltris(2-aminoethyl)amine or a like polyamine, is added for increasing the catalytic activity.

The tristriphenylphosphine complex of divalent ruthenium chloride [RuCl$_2$(PPh$_3$)$_3$] is also suited for use as the catalyst. When a ruthenium compound is used, an aluminum alkoxide is added as an activator. Further, the bistriphenylphosphine complex of divalent iron [FeCl$_2$(PPh$_3$)$_2$], bistriphenylphosphine complex of divalent nickel [NiCl$_2$(PPh$_3$)$_2$] and bistributylphosphine complex of divalent nickel [NiBr$_2$(PBu$_3$)$_2$] are also suitable as the catalyst.

The solvent mentioned above is not particularly restricted but includes, among others, hydrocarbon solvents such as benzene and toluene; ether solvents such as diethyl ether and tetrahydrofuran; halogenated hydrocarbon solvents such as methylene chloride and chloroform; ketone solvents such as acetone, methyl ethyl ketone and methyl isobutyl ketone; alcohol solvents such as methanol, ethanol, propanol, isopropanol, n-butyl alcohol and tert-butyl alcohol: nitrile solvents such as acetonitrile, propionitrile and benzonitrile; ester solvents such as ethyl acetate and butyl acetate; and carbonate solvents such as ethylene carbonate and propylene carbonate. These may be used singly or two or more of them may be used combinedly.

Said "atom transfer radical polymerization" can be carried out within the range of 0 to 200° C. preferably within the range of room temperature to 150° C.

Now, several specific methods of synthesizing the above-mentioned vinyl polymer having at least one crosslinkable silyl group are described below under (A) to (E). These, however, have no limitative meaning.

(A) Method comprising subjecting a vinyl polymer having at least one alkenyl group to addition reaction with a crosslinkable silyl-containing hydrosilane compound in the presence of a hydrosilylation catalyst;

(B) Method comprising reacting a vinyl polymer having at least one hydroxyl group with a compound having a crosslinkable silyl group and a functional group capable of reacting with a hydroxyl group, for example an isocyanato group;

(C) Method comprising subjecting a compound having a polymerizable alkenyl group and a crosslinkable silyl group, together with the predetermined vinyl monomer (s), to reaction in the step of synthesizing a vinyl polymer by radical polymerization;

(D) Method comprising carrying out radical polymerization using a crosslinkable silyl-containing chain transfer agent;

(E) Method comprising reacting a vinyl polymer having at least one highly reactive carbon-halogen bond with a crosslinkable silyl-containing stabilized carbanion.

The method of synthesizing the vinyl polymer having at least one alkenyl group, which is to be used in the above synthetic method (A), is not particularly restricted but may include the following methods (A-a) to (A-j), among others:

(A-a) Method comprising subjecting a compound having a polymerizable alkenyl group and an alkenyl group having low polymerizability, namely a compound represented by the general formula (2) shown below, together with the predetermined vinyl monomer(s), to reaction in the step of synthesizing a vinyl polymer by radical polymerization:

$$H_2C=C(R^3)-R^4-R^5-C(R^6)=CH_2 \quad (2)$$

wherein $R^3$ represents a hydrogen atom or a methyl group; $R^4$ represents —C(O)O— or an o-, m- or p-phenylene group; $R^5$ represents a direct bond or a divalent organic group containing 1 to 20 carbon atoms, which may optionally contain one or more ether bonds; and $R^6$ represents a hydrogen atom, an alkyl group containing 1 to 10 carbon atoms, an aryl group containing 6 to 10 carbon atoms or an aralkyl group containing 7 to 10 carbon atoms.

The time for submitting the above compound having a polymerizable alkenyl group and a low-polymerizable alkenyl group to reaction is not particularly restricted but, when rubber-like properties are expected of the polymer to be obtained, it is preferred that living radical polymerization be employed and that said compound be subjected to reaction as a second monomer component at the final stage of polymerization or after completion of the reaction of the vinyl monomer.

(A-b) Method comprising subjecting a compound having at least two low-polymerizable alkenyl groups, such as 1,5-hexadiene, 1,7-octadiene or 1,9-decadiene, to reaction as a second monomer component at the final stage of polymerization or after completion of the reaction of the predetermined vinyl monomer in synthesizing a vinyl polymer by living radical polymerization.

The following methods (A-c) to (A-f) are methods of preparing vinyl polymers having at least one alkenyl group mentioned above from a vinyl polymer having at least one highly reactive carbon-halogen bond, which in turn can be prepared by the methods (E-a) and (E-b) to be mentioned later herein.

(A-c) Method comprising reacting a vinyl polymer having at least one highly reactive carbon-halogen bond with an alkenyl-containing organometallic compound, such as allyltributyltin or allyltrioctyltin, to thereby substitute an alkenyl-containing group for the halogen.

(A-d) Method comprising reacting a vinyl polymer having at least one highly reactive carbon-halogen bond with an alkenyl-containing stabilized carbanion represented by the general formula (3) shown below, to thereby substitute an alkenyl-containing group for the halogen:

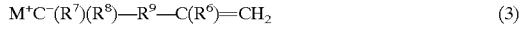

$$M^+C^-(R^7)(R^8)-R^9-C(R^6)=CH_2 \quad (3)$$

wherein $R^6$ is as defined above; $R^7$ and $R^8$ each represents an electron-withdrawing group serving to stabilize the carbanion $C^-$ or one of them represents such electron-withdrawing group and the other is a hydrogen atom, an alkyl group containing 1 to 10 carbon atoms or a phenyl group; $R^9$ represents a direct bond or a divalent organic group containing 1 to 10 carbon atoms, which may optionally contain one or more ether bonds; and $M^+$ represents an alkali metal ion or a quaternary ammonium ion. Preferred as the electron-withdrawing group represented by $R^7$ and/or $R^8$ are —$CO_2R$, —$C(O)R$ or —$CN$, in which R represents a hydrogen atom, an alkyl group containing 1 to 10 carbon atoms, an aryl group containing 6 to 10 carbon atoms or an aralkyl group containing 7 to 10 carbon atoms.

(A-e) Method comprising preparing an enolate anion by reacting a vinyl polymer having at least one highly reactive carbon-halogen bond with an elementary metal, such as zinc, or an organometallic compound and then reacting the enolate anion with an alkenyl-containing electrophilic compound, such as alkenyl-containing compound having a leaving group such as a halogen atom or an acetyl group, an alkenyl-containing carbonyl compound, an alkenyl-containing isocyanate compound or an alkenyl-containing acid halide compound.

(A-f) Method comprising reacting a vinyl polymer having at least one highly reactive carbon-halogen bond with an alkenyl-containing oxy anion represented by the general formula (4) shown below or an alkenyl-containing carboxylate anion represented by the general formula (5) shown below, to thereby substitute an alkenyl-containing group for the above halogen:

$$H_2C=C(R^6)-R^{10}-O^-M^+ \quad (4)$$

wherein $R^6$ and $M^+$ are as defined above and $R^{10}$ represents a divalent organic group containing 1 to 20 carbon atoms, which may optionally contain one or more ether bonds;

$$H_2C=C(R^6)-R^{11}-C(O)O^-M^+ \quad (5)$$

wherein $R^6$ and $M^+$ are as defined above and $R^{11}$ represents a direct bond or a divalent organic group containing 1 to 20 carbon atoms, which may contain one or more ether bonds.

The above-mentioned vinyl polymer having at least one alkenyl group can be obtained also from the corresponding vinyl polymer having at least one hydroxyl group. The specific method therefor is not particularly restricted but includes, among others, the methods (A-g) to (A-j) mentioned below. Said vinyl polymer having at least one hydroxyl group can be prepared by the methods (B-a) to (B-i) to be mentioned later herein.

(A-g) Method comprising reacting a vinyl polymer having at least one hydroxyl group with a base such as sodium methoxide and then reacting the resulting polymer with an alkenyl-containing halide such as allyl chloride.

(A-h) Method comprising reacting a vinyl polymer having at least one hydroxyl group with an alkenyl-containing isocyanate compound such as allyl isocyanate.

(A-i) Method comprising reacting a vinyl polymer having at least one hydroxyl group with an alkenyl-containing acid halide, such as (meth)acryloyl chloride, in the presence of a base such as pyridine.

(A-j) Method comprising reacting a vinyl polymer having at least one hydroxyl group with an alkenyl-containing carboxylic acid, such as acrylic acid, in the presence of an acid catalyst.

In synthesizing the above-mentioned vinyl polymer having at least one alkenyl group, when no halogen atom is directly involved in alkenyl group introduction, as in the case of the above methods (A-a) and (A-b), the use of living radical polymerization is preferred and, in that case, the method (A-b) is more preferred because of ease of control.

On the contrary, where alkenyl group introduction is effected by conversion of the halogen of a vinyl polymer having at least one highly reactive carbon-halogen bond, as in the case of the above methods (A-c) to (A-f), the use of a vinyl polymer having at least one highly reactive terminal carbon-halogen bond, which can be prepared by radical polymerization (atom transfer radical polymerization) using an organic halide or a halogenated sulfonyl compound as the initiator and a transition metal complex as the catalyst is preferred. In that case, the method (A-f) is more preferred because of each of control.

The crosslinkable silyl-containing hydrosilane compound to be used in the above synthetic method (A) is not particularly restricted but includes, among others, compounds represented by the following general formula (6):

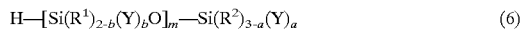

$$H-[Si(R^1)_{2-b}(Y)_bO]_m-Si(R^2)_{3-a}(Y)_a \quad (6)$$

wherein $R^1$, $R^2$, a, b, m and Y are as defined above.

Among these, compounds represented by the following general formula (7) are preferred because of ready availability:

$$H—Si(R^2)_{3-a}(Y)_a \quad (7)$$

wherein $R^2$, Y and a are as defined above.

In causing the above crosslinkable silyl-containing hydrosilane compound to add to the alkenyl group of the above-mentioned polymer by the above synthetic method (A), a transition metal catalyst is generally used as the hydrosilylation catalyst.

Said transition metal catalyst is not particularly restricted but includes, among others, elementary platinum; solid platinum dispersed and supported on a carrier such as alumina, silica or carbon black; chloroplatinic acid; complexes of chloroplatinic acid with an alcohol, aldehyde, ketone or the like; platinum-olefin complexes and platinum (0)-divinyl-tetramethyldisiloxane complex; compounds other than platinum compounds, such as $RhCl(PPh_3)_3$, $RhCl_3$, $RuCl_3$, $IrCl_3$, $FeCl_3$, $AlCl_3$, $PdCl_2.H_2O$, $NiCl_2$ and $TiCl_4$. These may be used singly or two or more of them may be used combinedly.

The method of synthesizing the vinyl polymer having at least one hydroxyl group, which is to be used in the above synthetic method (B) or in any of the above methods (A-g) to (A-j), is not particularly restricted but includes, among others, the methods (B-a) to (B-i) mentioned below.

(B-a) Method comprising subjecting a compound having a polymerizable alkenyl group and a hydroxyl group as represented by the general formula (8) shown below, together with the predetermined vinyl monomer, to reaction in the step of synthesizing the vinyl polymer by radical polymerization:

$$H_2C=C(R^3)—R^4—R^5—OH \quad (8)$$

wherein $R^3$, $R^4$ and $R^5$ are as defined above.

The time for subjecting said compound having a polymerizable alkenyl group and a hydroxyl group to reaction is not particularly restricted but, when rubber-like properties are expected of the polymer to be obtained, it is preferred that living radical polymerization be employed and that said compound be added as a second monomer component at the final stage of polymerization or after completion of the reaction of the predetermined vinyl monomer.

(B-b) Method comprising subjecting an alkenyl alcohol, such as 10-undecenol, 5-hexenol or allyl alcohol, to reaction as a second monomer component at the final stage of polymerization or after completion of the predetermined vinyl monomer in synthesizing the vinyl polymer by living radical polymerization.

(B-c) Method comprising subjecting the above vinyl monomer to radical polymerization using a large amount of a hydroxyl-containing chain transfer agent, such as a hydroxyl-containing polysulfide, as disclosed in Japanese Kokai Publication Hei-5-262808.

(B-d) Method comprising subjecting the above vinyl monomer to radical polymerization using hydrogen peroxide or a hydroxyl-containing initiator, as disclosed in Japanese Kokai Publication Hei-6-239912 or Japanese Kokai Publication Hei-8-283310.

(B-e) Method comprising subjecting the above vinyl monomer to radical polymerization using an alcohol in excess, as disclosed in Japanese Kokai Publication Hei-6-116312.

(B-f) Method comprising subjecting the halogen atom of a vinyl polymer having at least one highly reactive carbon-halogen bond to hydrolysis or reaction with a hydroxyl-containing compound to thereby terminally introduce a hydroxyl group.

(B-g) Method comprising reacting a vinyl polymer having at least one highly reactive carbon-halogen bond with a hydroxyl-containing stabilized carbanion represented by the general formula (9) shown below to thereby substitute a hydroxyl-containing substituent for the halogen atom:

$$M^+C^-(R^7)(R^8)—R^9—OH \quad (9)$$

wherein $R^7$, $R^8$ and $R^9$ are as defined above. As the electron-withdrawing group represented by $R^7$ or $R^8$, $—CO_2R$, $—C(O)R$ and $—CN$ are preferred (R being as defined above).

(B-h) Method comprising preparing an enolate anion by reacting a vinyl polymer having at least one highly reactive carbon-halogen bond with an elementary metal, such as zinc, or an organometallic compound and then reacting said enolate anion with an aldehyde or ketone.

(B-i) Method comprising reacting a vinyl polymer having at least one highly reactive carbon-halogen bond with a hydroxyl-containing oxy anion represented by the general formula (10) shown below or a hydroxyl-containing carboxylate anion represented by the general formula (11) shown below to thereby substitute a hydroxyl-containing group for the halogen.

$$HO—R^{10}—O^-M^+ \quad (10)$$

wherein $R^{10}$ and $M^+$ are as defined above;

$$HO—R^{11}—C(O)O^-M^+ \quad (11)$$

wherein $R^{11}$ and $M^+$ are as defined above.

In synthesizing the above-mentioned vinyl polymer having at least one hydroxyl group, when no halogen atom is involved in introducing the hydroxyl group, as in the above methods (B-a) to (B-e), living radical polymerization is preferably used. In that case, the method (B-b) is more preferred because of ease of control.

In cases where hydroxyl group introduction is effected by converting the halogen of a vinyl polymer having at least one highly reactive carbon-halogen bond, as in the above methods (B-f) to (B-i), the use is preferred of a vinyl polymer having at least one highly reactive terminal carbon-halogen bond, which is obtained by radical polymerization (atom transfer radical polymerization) using an organic halide or halogenated sulfonyl compound as the initiator and a transition metal complex as the catalyst. In that case, the method (B-i) is preferred because of ease of control.

The compound having a crosslinkable silyl group and a functional group capable of reacting with a hydroxyl group, for example an isocyanato group, is not particularly restricted but includes, among others, γ-isocyanatopropyltrimethoxysilane, γ-isocyanatopropylmethyldimethoxysilane and γ-isocyanato-propyltriethoxysilane. These may be used singly or two or more of them may be used combinedly.

In carrying out the reaction in the above synthetic method (B), it is also possible to use a per se known catalyst for urethane formation reaction, if necessary.

The compound having a polymerizable alkenyl group and a crosslinkable silyl group, which is to be used in the above synthetic method (C), is not particularly restricted but includes, among others, compounds represented by the general formula (12) shown below, such as trimethoxysilylpropyl (meth)acrylate and methyldimethoxysilylpropyl (meth)acrylate:

$$H_2C=C(R^3)—R^4—R^{12}—[Si(R^1)_{2-b}(Y)_bO]_m—Si(R^2)_{3-a}(Y)_a \quad (12)$$

wherein $R^1$, $R^2$, $R^3$, $R^4$, Y, a, b and m are as defined above and $R^{12}$ represents a direct bond or a divalent organic group containing 1 to 20 carbon atoms, which may contain one or more ether bonds. These compounds may be used singly or two or more of them may be used combinedly.

In the above synthetic method (C), the time for subjecting said compound having a polymerizable alkenyl group and a crosslinkable silyl group to reaction is not particularly restricted but, when rubber-like properties are expected of the polymer to be obtained, it is preferred that, in living radical polymerization, said compound be subjected to reaction as a second monomer component at the last stage of polymerization or after completion of the reaction of the predetermined vinyl monomer.

The crosslinkable silyl-containing chain transfer agent to be used in carrying out the above synthetic method (D) is not particularly restricted but includes crosslinkable silyl-containing mercaptans and crosslinkable silyl-containing hydrosilanes, as disclosed in Japanese Kokoku Publication Hei-3-14068 or Japanese Kokoku Publication Hei-4-55444.

The method of synthesizing the vinyl polymer having at least one highly reactive carbon-halogen bond to be used in the above synthetic method (E) and further in the above methods (A-c) to (A-f) and (B-f) to (B-i) is not particularly restricted but includes, among others, the methods (E-a) and (E-b) mentioned below.

(E-a) Method disclosed in Japanese Kokai Publication Hei-4-132706 and comprising carrying out radical polymerization using a halide, such as carbon tetrachloride, ethylene chloride, carbon tetrabromide or methylene bromide, as the chain transfer agent (chain transfer agent method).

(E-b) Method involving the above-mentioned atom transfer radical polymerization using an organic halide as the initiator and a transition metal complex as the catalyst.

The crosslinkable silyl-containing stabilized carbanion to be used in the above synthetic method (E) is not particularly restricted but includes, among others, compounds represented by the following general formula (13):

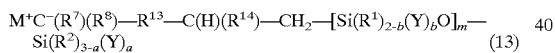
(13)

wherein $R^1$, $R^2$, $R^7$, $R^8$, Y, a, b and m are as defined above; $R^{13}$ represents a direct bond or a divalent organic group containing 1 to 10 carbon atoms, which may contain one or more ether bonds; and $R^{14}$ represents a hydrogen atom, an alkyl group containing 1 to 10 carbon atoms, an aryl group containing 6 to 10 carbon atoms or an aralkyl group containing 7 to 10 carbon atoms. Preferred as the electron-withdrawing group represented by $R^7$ or $R^8$ are —$CO_2R$, —$C(O)R$ and —CN, R being as defined above.

In cases where the adhesive curable composition of the present invention is to be used in an application field requiring rubber-like properties, the above-mentioned vinyl polymer having at least one crosslinkable silyl group is preferably one having at least one crosslinkable silyl group at a molecular chain terminus so that the molecular weight between crosslinking sites, which exerts a great influence on rubber elasticity, may be increased. It is more preferred that said polymer have all crosslinkable silyl groups at molecular chain termini.

Therefore, the vinyl polymer having at least one hydroxyl group or halogen atom or alkenyl group, which is to be used in synthesizing the polymer having at least one crosslinkable silyl group, is preferably one having such functional group or atom at a molecular chain terminus.

Certain methods are disclosed in Japanese Kokoku Publication Hei-3-14068, Japanese Kokoku Publication Hei-4-55444 and Japanese Kokai Publication Hei-6-211922, among others, for producing said vinyl polymer having at least one crosslinkable silyl group at a molecular chain terminus, in particular such a (meth)acrylic polymer. However, these methods use the above-mentioned "chain transfer agent method" and therefore, while the polymer obtained has a relatively high proportion of crosslinkable silyl groups occurring at a molecular chain terminus, it is a problem that the molecular weight distribution value represented by Mw/Mn is generally as high as not less than 2, hence said polymer has an increased viscosity. Therefore, for obtaining such vinyl polymer having a narrow molecular weight distribution, a low viscosity and a high proportion of crosslinkable silyl groups occurring at a molecular chain terminus, the above-mentioned "living radical polymerization" is preferably employed.

For obtaining such vinyl polymer having at least one crosslinkable silyl group at a molecular chain terminus by the "atom transfer radical polymerization" technique, which is preferred among the "living radical polymerization" techniques, an organic halide or halogenated sulfonyl compound having two or more initiation sites is preferably used as the initiator. The thus-obtained vinyl polymer having at least one highly reactive carbon-halogen bond at a molecular chain terminus can readily be converted to a vinyl polymer having at least one crosslinkable silyl group at a molecular chain terminus by the methods mentioned above.

Said organic halide or halogenated sulfonyl compound having two or more initiation sites is not particularly restricted but includes those compounds which are represented by the general formulas (14-1) to (14-11) and (15-1) to (15-10) shown below. These may be used singly or two or more of them may be used in combination.

(14-1)

(14-2)

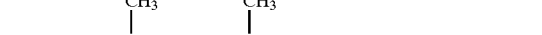
(14-3)

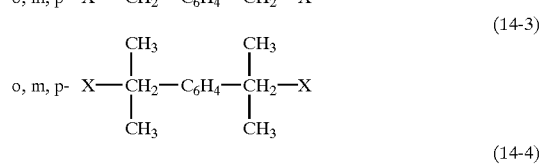
(14-4)

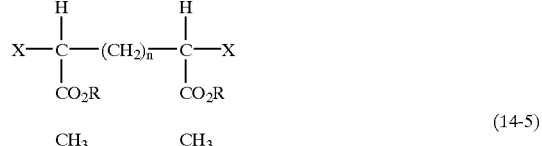
(14-5)

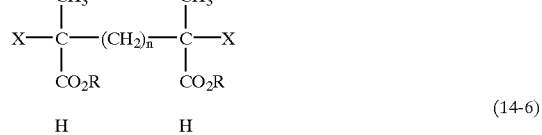
(14-6)

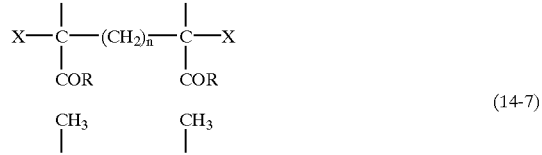
(14-7)

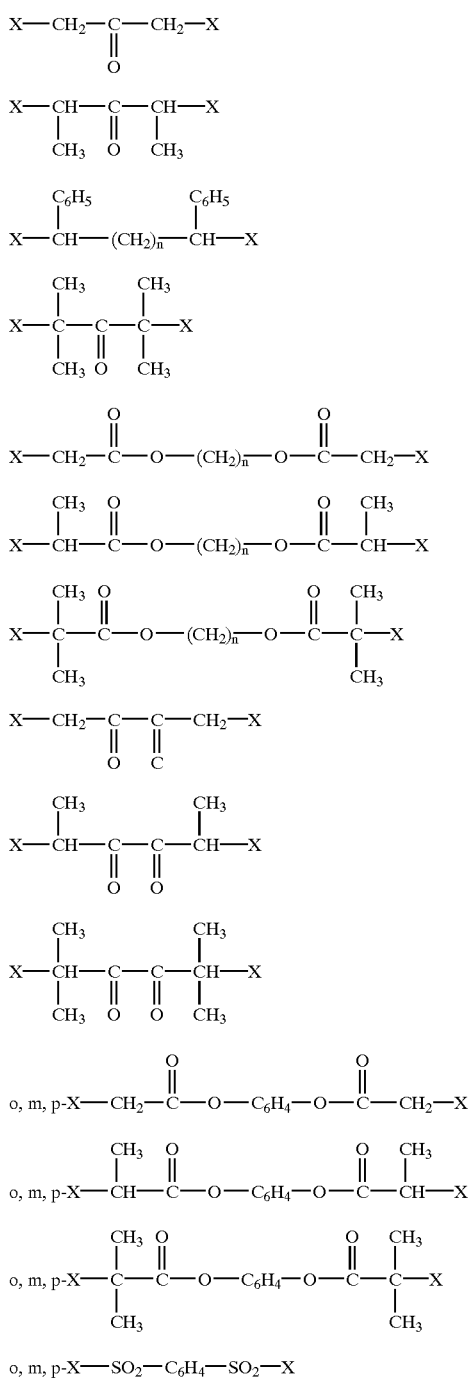

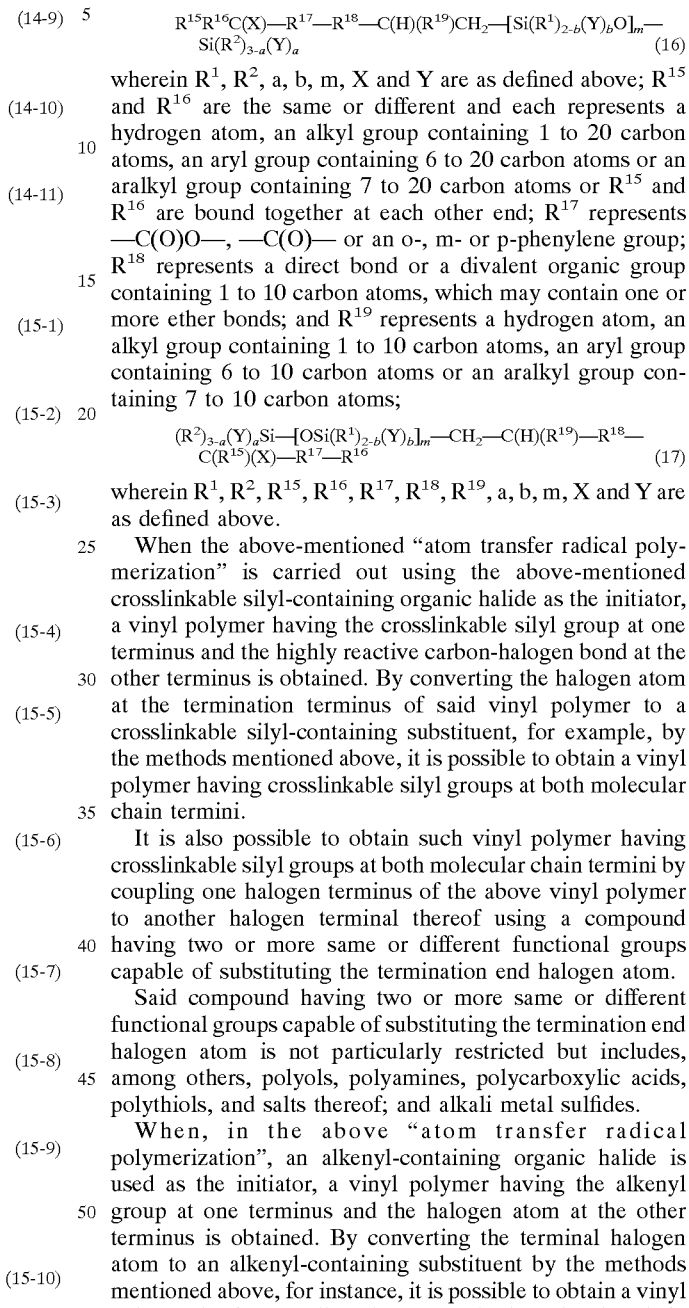

In the above formulas, R represents an alkyl group containing 1 to 20 carbon atoms, an aryl group containing 6 to 20 carbon atoms or an aralkyl group containing 7 to 20 carbon atoms; $C_6H_4$ represents a phenylene group; n represents an integer of 0 to 20; and X represents a chlorine, bromine or iodine atom.

For obtaining a vinyl polymer having crosslinkable silyl groups at both molecular chain termini, the method comprising carrying out the above-mentioned "atom transfer radical polymerization" using an organic halide or halogenated sulfonyl compound having two initiation sites as well as the method comprising a crosslinkable silyl-containing organic halide are preferred.

Said crosslinkable silyl-containing organic halide is not particularly restricted but includes, among others, compounds represented by the following general formula (16) or (17):

$$R^{15}R^{16}C(X)-R^{17}-R^{18}-C(H)(R^{19})CH_2-[Si(R^1)_{2-b}(Y)_bO]_m-Si(R^2)_{3-a}(Y)_a \qquad (16)$$

wherein $R^1$, $R^2$, a, b, m, X and Y are as defined above; $R^{15}$ and $R^{16}$ are the same or different and each represents a hydrogen atom, an alkyl group containing 1 to 20 carbon atoms, an aryl group containing 6 to 20 carbon atoms or an aralkyl group containing 7 to 20 carbon atoms or $R^{15}$ and $R^{16}$ are bound together at each other end; $R^{17}$ represents —C(O)O—, —C(O)— or an o-, m- or p-phenylene group; $R^{18}$ represents a direct bond or a divalent organic group containing 1 to 10 carbon atoms, which may contain one or more ether bonds; and $R^{19}$ represents a hydrogen atom, an alkyl group containing 1 to 10 carbon atoms, an aryl group containing 6 to 10 carbon atoms or an aralkyl group containing 7 to 10 carbon atoms;

$$(R^2)_{3-a}(Y)_aSi-[OSi(R^1)_{2-b}(Y)_b]_m-CH_2-C(H)(R^{19})-R^{18}-C(R^{15})(X)-R^{17}-R^{16} \qquad (17)$$

wherein $R^1$, $R^2$, $R^{15}$, $R^{16}$, $R^{17}$, $R^{18}$, $R^{19}$, a, b, m, X and Y are as defined above.

When the above-mentioned "atom transfer radical polymerization" is carried out using the above-mentioned crosslinkable silyl-containing organic halide as the initiator, a vinyl polymer having the crosslinkable silyl group at one terminus and the highly reactive carbon-halogen bond at the other terminus is obtained. By converting the halogen atom at the termination terminus of said vinyl polymer to a crosslinkable silyl-containing substituent, for example, by the methods mentioned above, it is possible to obtain a vinyl polymer having crosslinkable silyl groups at both molecular chain termini.

It is also possible to obtain such vinyl polymer having crosslinkable silyl groups at both molecular chain termini by coupling one halogen terminus of the above vinyl polymer to another halogen terminal thereof using a compound having two or more same or different functional groups capable of substituting the termination end halogen atom.

Said compound having two or more same or different functional groups capable of substituting the termination end halogen atom is not particularly restricted but includes, among others, polyols, polyamines, polycarboxylic acids, polythiols, and salts thereof; and alkali metal sulfides.

When, in the above "atom transfer radical polymerization", an alkenyl-containing organic halide is used as the initiator, a vinyl polymer having the alkenyl group at one terminus and the halogen atom at the other terminus is obtained. By converting the terminal halogen atom to an alkenyl-containing substituent by the methods mentioned above, for instance, it is possible to obtain a vinyl polymer having an alkenyl group at both molecular chain termini. By converting these alkenyl groups within this vinyl polymer to crosslinkable silyl groups by the methods mentioned above, for instance, it is possible to obtain a vinyl polymer having a crosslinkable silyl group at both molecular chain termini.

Said vinyl polymer having at least one crosslinkable silyl group at a molecular chain terminus can be prepared by an appropriate combination of the methods mentioned above. As typical examples, the following synthetic processes a and b may be mentioned.

Synthetic Process a

A synthetic process comprising (1) synthesizing a halogen-terminated vinyl polymer by subjecting a vinyl monomer to radical polymerization using an organic halide or halogenated sulfonyl compound as the initiator and a transition metal complex as the catalyst, (2) reacting said polymer with an alkenyl-containing oxy anion for substitution of the terminal halogen, to give an alkenyl-terminated vinyl polymer and (3) allowing a crosslinkable silyl-containing hydrosilane compound to add to the terminal alkenyl group of said polymer to thereby convert said alkenyl group to a crosslinkable silyl-containing substituent.

Synthetic Process b

A synthetic process comprising (1) synthesizing a vinyl polymer by subjecting a vinyl monomer to living radical polymerization, (2) then reacting said polymer with a compound having at least two alkenyl groups with low polymerizability to thereby synthesize an alkenyl-terminated vinyl polymer and (3) converting the terminal alkenyl groups to crosslinkable silyl-containing substituents by allowing a crosslinkable silyl-containing hydrosilane compound to add to terminal alkenyl groups of said polymer.

The adhesive curable composition of the present invention comprises the vinyl polymer having at least one crosslinkable silyl group as obtained in the above manner. For curing said composition, a condensation catalyst may be incorporated therein.

Said condensation catalyst is not particularly restricted but includes, among others, titanate esters such as tetrabutyl titanate and tetrapropyl titanate; organotin compounds such as dibutyltin dilaurate, dibutyltin diacetylacetonate, dibutyltin maleate, dibutyltin diacetate, dibutyltin dimethoxide, reaction products derived from dibutyltin oxide and a carboxylic acid ester, carboxylic acid or hydroxyl-containing compound, tin octylate and tin naphthenate; organoaluminum compounds such as aluminum trisacetylacetonate, aluminum tris(ethyl acetoacetate) and diisopropoxyaluminum ethyl acetoacetate; organozirconium compounds such as zirconium tetraacetylacetonate, zirconium tetraisopropoxide and zirconium tetrabutoxide; organolead compounds such as lead octylate; amine compounds such as butylamine, octylamine, dibutylamine, monoethanolamine, diethanolamine, triethanolamine, diethylenetriamine, triethylenetetramine, oleylamine, octylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine and 1,3-diazabicyclo[5.4.6]-undecene-7, and carboxylic acid salts thereof; reaction products from or mixtures of an amine compound and an organotin compound, such as a reaction product from or a mixture of laurylamine and tin octylate; low-molecular polyamide resins obtained from an excess of a polyamine and a polybasic acid; reaction products from an excess of a polyamine and an epoxy compound; amino-containing silane coupling agents such as γ-aminopropyltrimethoxysilane and N-(β-aminoethyl)-aminopropylmethyldimethoxysilane; and like known silanol condensation catalysts. These may be used singly or two or more of them may be used combinedly.

The addition amount of said condensation catalyst is not particularly restricted but is preferably within the range of, for example 0 to 10 parts by weight per 100 parts by weight of the vinyl polymer having at least one crosslinkable silyl group. While it is not always necessary to incorporate the above condensation catalyst, it is preferred that said condensation catalyst is incorporated when the vinyl polymer having at least one crosslinkable silyl group has an alkoxy group as the hydrolyzable group, since, in that case, the rate of curing is slow.

In the adhesive curable composition of the present invention, the vinyl polymer having at least one crosslinkable silyl group itself has adhesiveness to glass, ceramics other than glass, and metals, among others, and can be adhered to a wide variety of materials by using various primers, so that the use of an adhesion promoter is not always necessary. For attaining stable adhesion to various substrates, parts, supports and adherends, however, the use of an adhesion promoter is preferred.

Said adhesion promoter is not particularly restricted but includes, among others, resol type or novolak type phenolic resins obtained by the reaction of a phenol compound, such as phenol, cresol, xylenol, resorcinol, alkylphenol, or modified phenol (e.g. cashew nut oil-modified phenol, tall oil-modified phenol), with an aldehyde compound such as formaldehyde or paraformaldehyde; sulfur; epoxy resins such as bisphenol A-based epoxy resins, bisphenol F-based epoxy resins, novolak type epoxy resins, bisphenol A-propylene oxide adduct-derived glycidyl ether type epoxy resins and hydrogenated bisphenol A-based epoxy resins; alkyl titanates such as tetrabutyl titanate; aromatic polyisocyanates such as tolylene diisocyanate and diphenylmethanediisocyanate; amino- and crosslinkable silyl-containing compounds such as γ-aminopropyltrimethoxysilane, γ-aminopropyltriethoxysilane, γ-aminopropylmethyldimethoxysilane, N-(β-aminoethyl)-γ-aminopropyltrimethoxysilane, N-(β-aminoethyl)-γ-aminopropyltriethoxysilane and N-(β-aminoethyl)-γ-aminopropylmethyldimethoxysilane; epoxy- and crosslinkable silyl-containing compounds such as γ-glycidoxypropyltrimethoxysilane, γ-glycidoxypropyltriethoxysilane and γ-glycidoxypropylmethyldimethoxysilane; mercapto- and crosslinkable silyl-containing compounds such as γ-mercaptopropyltrimethoxysilane, γ-mercaptopropyltriethoxysilane and γ-mercaptopropylmethyldimethoxysilane; isocyanato- and crosslinkable silyl-containing compounds such as γ-isocyanatopropyltrimethoxysilane, γ-isocyanatopropyltriethoxysilane and γ-isocyanatopropylmethyldimethoxysilane; reaction products from the above amino- and crosslinkable silyl-containing compounds and the above epoxy- and crosslinkable silyl-containing compounds or isocyanato- and crosslinkable silyl-containing compounds; reaction products from a (meth)acryloxy- and crosslinkable silyl-containing compounds, such as γ-(meth)acryloxypropyltrimethoxysilane, γ-(meth)acryloxypropyltriethoxysilane or γ-(meth)acryloxypropylmethyldimethoxysilane, and the above amino- and crosslinkable silyl-containing compounds; and the like. These may be used singly or two or more of them may be used in combination.

Preferred among those mentioned above from the viewpoint of relatively easy control of physical properties and adhesiveness are amino- and crosslinkable silyl-containing compounds, epoxy- and crosslinkable silyl-containing compounds, mercapto- and crosslinkable silyl-containing compounds, isocyanato- and crosslinkable silyl-containing compounds, reaction products from an amino- and crosslinkable silyl-containing compound and an epoxy- and crosslinkable silyl-containing compound or isocyanato- and crosslinkable silyl-containing compound, reaction products from a (meth)acryloxy- and crosslinkable silyl-containing compound and an amino- and crosslinkable silyl-containing compound, and like crosslinkable silyl-containing compounds having an organic group having at least one atom selected from among nitrogen, oxygen and sulfur atoms. More preferred because of high adhesiveness are crosslinkable silyl-containing compounds having a nitrogen atom-containing organic group which is an amino or isocyanato group or a group formed upon reaction thereof.

Said adhesion promoter is preferably used in an amount within the range of 0.01 to 20 parts by weight per 100 parts by weight of the vinyl polymer having at least one crosslinkable silyl group. When the amount is less than 0.01 part by weight, the adhesion improving effect can hardly be produced. When it is in excess of 20 parts by weight, the physical properties of the cured product may adversely be affected. A more preferred range is 0.1 to 10 parts by weight and a still more preferred range is 0.5 to 5 parts by weight.

By incorporating a physical property modifier in the adhesive curable composition of the present invention, it is possible to control the physical properties of the cured product by increasing the hardness upon curing or by conversely reducing the hardness and increasing the elongation.

Said physical property modifier is not particularly restricted but includes, among others, alkylalkoxysilanes such as methyltrimethoxysilane, dimethyldimethoxysilane, trimethylmethoxysilane and n-propyltrimethoxysilane; alkylisopropenoxysilanes such as dimethyldiisopropenoxysilane, methyltriisopropenoxysilane and -glycidoxypropylmethyldiisopropenoxysilane; silane coupling agents such as vinyltrimethoxysilane and vinylmethyldimethoxysilane; silicone varnishes; and polysiloxanes. These may be used singly or two or more of them may be used combinedly.

The above physical property modifier is preferably used in an amount within the range of 0 to 20 parts by weight per 100 parts by weight of the vinyl polymer having at least one crosslinkable silyl group.

By incorporating a curability modifier in the adhesive curable composition of the present invention, it is possible to raise or reduce the rate of curing and, by incorporating a storage stability improver, it is possible to suppress viscosity increase during storage. Said curability modifier and storage stability improver are not particularly restricted but include, among others, alcohols such as methanol and ethanol; ortho esters such as methyl orthoformate; crosslinkable silyl-containing compounds such as tetraethoxysilane, methyltrimethoxysilane and vinyltrimethoxysilane; and carboxylic acids such as 2-ethyhexanoic acid. Where required, these may be used singly or two or more of them may be used combinedly. Said curability modifier and storage stability improver are preferably used in an amount within the range of 0 to 20 parts by weight per 100 parts by weight of the vinyl polymer having at least one crosslinkable silyl group.

In the adhesive curable composition of the present invention, there may further be incorporated according to need, in addition to the above ingredients, one or more additives selected from among various fillers such as silica, carbon black and calcium carbonate; various plasticizers, for example aromatic dibasic acid esters such as di(2-ethylhexyl) phthalate, nonaromatic dibasic acid esters such as dioctyl adipate, polyethers such as polypropylene glycol and acrylic oligomers; various solvents such as toluene and methyl ethyl ketone; various silane coupling agents; various modifiers such as crosslinkable silyl-containing polysiloxanes; rheology modifiers such as polyamide waxes, hydrogenated castor oil and metal soaps; surface characteristics and/or weathering resistance improvers for ultraviolet-curable resins, oxygen-curable resins and the like; colorants, such as pigments and dyes; antioxidants, ultraviolet absorbers, light stabilizers, flame retardants and so forth.

The adhesive curable composition of the present invention can judiciously be used as a sealing composition.

When the adhesive curable composition of the present invention is used as a sealing composition, a filler may be incorporated therein to modify the mechanical properties.

Said filler is not particularly restricted but includes, among others, reinforcing fillers such as fumed silica, precipitated silica, silicic anhydride, hydrous silicic acid and carbon black; fillers such as calcium carbonate, magnesium carbonate, diatomaceous earth, calcined clay, clay, talc, titanium oxide, bentonite, organic bentonite, ferric oxide, zinc oxide, activated zinc white and shirasu balloons; and fibrous fillers such as asbestos, glass fiber and filaments. These may be used singly or two or more of them may be used combinedly.

For obtaining high strength cured products using the above fillers, the use of fumed silica, precipitated silica, silicic anhydride, hydrous silicic acid, carbon black, finely divided surface-treated calcium carbonate, calcined clay, clay, activated zinc white or the like as the filler is preferred. In that case, said filler is used in an amount within the range of 1 to 200 parts by weight per 100 parts by weight of the vinyl polymer having at least one crosslinkable silyl group.

On the other hand, for obtaining low-strength, high-elongation cured products, the use of titanium oxide, calcium carbonate, talc, ferric oxide, zinc oxide, shirasu balloons or the like is preferred. In that case, the filler is used in an amount within the range of 1 to 200 parts by weight per 100 parts by weight of the vinyl polymer having at least one crosslinkable silyl group.

For use as a sealing composition, a plasticizer may be incorporated to modify the physical properties and viscosity.

Said plasticizer is not particularly restricted but includes, among others, phthalate esters such as dibutyl phthalate, diheptyl phthalate, di(2-ethylhexyl)phthalate, diisodecyl phthalate and butyl benzyl phthalate; nonaromatic dibasic acid esters such as dioctyl adipate and dioctyl sebacate; polyalkylene glycol esters such as diethylene glycol dibenzoate and triethylene glycol dibenzoate; phosphate esters such as tricresyl phosphate and tributyl phosphate; polyethylene glycol, polypropylene glycol, and polyethers derived therefrom by conversion of the hydroxyl groups; chlorinated paraffins; and hydrocarbon oils such as alkyldiphenyls and partially hydrogenated terphenyl. These may be used singly or two or more of them may be used combinedly. Incorporation thereof is not always necessary, however. The plasticizer may be incorporated beforehand in the step of polymer production.

The plasticizer is preferably incorporated in an amount of 0 to 100 parts by weight per 100 parts by weight of the vinyl polymer having at least one crosslinkable silyl group.

By mixing up all components and ingredients, said sealing composition may be prepared as a one-component formulation, which is stored in tightly closed containers and, when applied, it absorbs moisture in the air and is thereby cured. It is also possible to prepare said composition as a two-component formulation, namely a curing agent composition, which is obtained by separately prepared by compounding a curing catalyst, filler, plasticizer and water, for instance, and mixing up the above components prior to use. However, a one-component formulation is preferred because of ease of handling and less possibility of making mistakes in application.

The adhesive curable composition of the present invention can judiciously be used as a pressure sensitive adhesive composition as well.

In cases where the adhesive curable composition of the present invention is used as a pressure sensitive adhesive composition, a tackifier resin may be added, if necessary, although the addition thereof is not always necessary since said composition comprises the vinyl polymer as the main component.

Said tackifier resin is not particularly restricted but includes, among others, phenolic resins, modified phenolic resins, cyclopentadiene-phenol resins, xylene resins, chroman resins, petroleum resins, terpene resins, terpene-phenol resins, and rosin ester resins. These may by used singly or two or more of them may be used combinedly.

A solvent may be added to the above pressure sensitive adhesive composition for workability adjustment. Said solvent is not particularly restricted but includes, among others, aromatic hydrocarbon solvents such as toluene and xylene; ester solvents such as ethyl acetate, butyl acetate, amyl acetate and cellosolve acetate; and ketone solvents such as methyl ethyl ketone, methyl isobutyl ketone and diisobutyl ketone. Said solvent may be the one used in the step of producing the above-mentioned polymer.

Said pressure sensitive adhesive composition can be applied in adhesive products such as adhesive tapes, sheets, labels and foils. For producing such adhesive products using said pressure sensitive adhesive composition, said pressure sensitive adhesive composition is applied, in solvent type, emulsion type or hot melt type form, to substrate materials such as films made of a synthetic resin or modified natural product, paper, various kinds of cloth, metal foils, metallized plastic foils, asbestos, and glass fiber cloth and the coatings are then exposed to moisture or water and allowed to stand for curing at room temperature, or heated for curing.

The adhesive curable composition of the present invention can further be used as a paint composition.

On that occasion, the vinyl polymer having at least one crosslinkable silyl group is preferably synthesized by the above-mentioned synthetic method (C) which comprises subjecting a compound having a polymerizable alkenyl group and a crosslinkable silyl group as represented by the above general formula (12) to reaction in the step of synthesizing the vinyl polymer by radical polymerization, since said method of production is simple and easy to carry out and makes it possible to attain a high solid content in the paint composition.

Among the compounds having a polymerizable alkenyl group and a crosslinkable silyl group, those compounds in which the crosslinkable silyl group is an alkoxysilyl group are preferred from the viewpoint of cost and safety. Such compounds are not particularly restricted but include, among others, $CH_2=CHCO_2(CH_2)_3Si(OCH_3)_3$, $CH_2=CHCO_2(CH_2)_3Si(CH_3)(OCH_3)_2$, $CH_2=C(CH_3)CO_2(CH_2)_3Si(OCH_3)_3$, $CH_2=C(CH_3)CO_2(CH_2)_3Si(CH_3)(OCH_3)_2$, $CH_2=CHCO_2(CH_2)_3Si(OC_2H_5)_3$, $CH_2=CHCO_2(CH_2)_3Si(CH_3)(OC_2H_5)_2$, $CH_2=C(CH_3)CO_2(CH_2)_3Si(OC_2H_5)_3$, $CH_2=C(CH_3)CO_2(CH_2)_3Si(CH_3)(OC_2H_5)_2$, $CH_2=CHCO_2(CH_2)_3Si(OC_2H_5)_3$, $CH_2=CHCO_2(CH_2)_3Si(CH_3)(OC_{H5})_2$, $CH_2=C(CH_3)CO_2(CH_2)_3Si(OC_2H_5)_3$, $CH_2=C(CH_3)CO_2(CH_2)_3Si(CH_3)(OC_2H_5)_2$ and so forth. These compounds may be used singly or two or more of them may be used in admixture.

More preferred are $CH_2=CHCO_2(CH_2)_3Si(OCH_3)_3$, $CH_2=CHCO_2(CH_2)_3Si(CH_3)(OCH_3)_2$, $CH_2=C(CH_3)CO_2(CH_2)_3Si(OCH_3)_3$ and $CH_2=C(CH_3)CO_2(CH_2)_3Si(CH_3)(OCH_3)_2$.

For preparing a paint composition which can have a high solid content and can provide excellent elastic properties using the adhesive curable composition of the present invention, that vinyl polymer which has at least one crosslinkable silyl group at a molecular chain terminus is preferably used. The vinyl polymer may be one produced by copolymerizing a small amount, relative to the vinyl monomer, of a compound having a polymerizable alkenyl group and a crosslinkable silyl group as represented by the above general formula (12) with said vinyl monomer to thereby introducing the crosslinkable silyl group into the molecular chain for adjusting the crosslinking site-to-crosslinking site molecular weight.

The mixing ratio in the reaction between said compound having a polymerizable alkenyl group and a crosslinkable silyl group and the other vinyl monomer is not particularly restricted but is preferably such that said compound accounts for 1 to 50 mole percent, more preferably 2 to 40 mole percent, still more preferably 3 to 30 mole percent, based on the total monomer composition to be subjected to polymerization. When the proportion of said compound is less than 1 mole percent, the curability will be insufficient. When it is in excess of 50 mole percent, poor storage stability will result.

Since the "controlled radical polymerization method" already described hereinabove is used here as the polymerization method, the vinyl polymer can be obtained with a narrow molecular weight distribution. Since the polymer has a viscosity suppressed to a low level owing to the narrow molecular weight distribution, it is possible to provide the paint composition with spreadability, which is required of said composition, with a smaller amount of a solvent.

In addition to the additives mentioned hereinabove as suited for incorporation in the adhesive curable composition, such additives as resins, such as polyester, epoxy and acrylic resins, colorants, spreading agents, antifoams and antistatics may be added to the above paint composition, where necessary. The addition amount of such additives can judiciously selected according to the characteristics to be acquired. These additives may be used singly or two or more of them may be used combinedly.

The colorants mentioned above are not particularly restricted but include, among others, inorganic pigments such as titanium dioxide, carbon black, iron oxide and chromium oxide; and organic pigments such as phthalocyanines and quinacridones.

The above paint composition prepared by adding, according to need, a curing catalyst and additive(s) to the vinyl polymer having at least one crosslinkable silyl group, then applying the same to substrates and curing, gives uniform coat films. The hydrolysis and/or condensation of the crosslinkable silyl group progresses at room temperature, so that no heating is required in the step of curing. However, heating may be made for promoting the curing. The heating temperature is 20 to 200° C., preferably 50 to 180° C.

The paint composition of the present invention may be used as a solvent type one or a water-based type one. It is also possible to use said composition as a powder coating composition by distilled off the volatile matter from the vinyl polymer, which is the main component, and adding desired ingredients thereto and finely divided the resulting compound.

BEST MODES FOR CARRYING OUT THE INVENTION

The following examples illustrate the present invention in further detail. It is to be noted, however, that these examples are by no means limitative of the scope of the present invention.

REFERENCE EXAMPLE 1
Synthesis of a Hydroxyl-Containing Initiator

In a nitrogen atmosphere, 2-bromopropionyl chloride (2 mL, 3.35 g, 19.5 mmol) was slowly added dropwise at 0° C. to a THF solution (10 mL) containing ethylene glycol (10.9 mL, 195 mmol) and pyridine (3 g, 39 mmol). The resulting solution was stirred at the same temperature for 2 hours. Dilute hydrochloric acid and ethyl acetate were added and mixture was allowed to separate into two phases. The organic phase was washed with dilute hydrochloric acid and brine, and dried over $Na_2SO_4$. The volatile matter was distilled off under reduced pressure and a crude product (3.07 g) was obtained. This crude product was distilled under reduced pressure (70–73° C., 0.5 mm Hg) to give hydroxyethyl 2-bromopropionate (2.14 g, 56%) represented by the following formula:

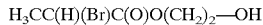

$H_3CC(H)(Br)C(O)O(CH_2)_2$—OH

SYNTHESIS EXAMPLE 1
Synthesis of a Hydroxyl-Terminated Poly(n-butyl Acrylate)

A one-liter pressure reaction vessel was charged with n-butyl acrylate (112 mL, 100 g, 0.78 mol), the hydroxyl-containing initiator obtained in Reference Example 1 (3.07 g, 15.6mmol), cuprous bromide(2.24g, 15.6mmol), 2,2'-bipyridyl (4.87g, 31.2 mmol), ethyl acetate (80 mL) and acetonitrile (20 mL), the dissolved oxygen was removed by bubbling with nitrogen, and the vessel was sealed. The mixture was heated at 130° C. and the reaction was allowed to proceed for 2 hours. The reaction vessel was cooled to room temperature, 2-hydroxyethyl methacrylate (3.92 mL, 4.06 g, 31.2 mmol) was added, and the reaction was allowed to proceed at 110° C. for 2 hours. The mixture was diluted with ethyl acetate (200 mL), the insoluble matter was filtered off, the filtrate was washed with 10% hydrochloric acid and brine and the organic layer was dried over $Na_2SO_4$. The solvent was distilled of f under reduced pressure to give 82 g of a hydroxyl-terminated poly(n-butyl acrylate). This polymer had a viscosity of 25 Pa·s and a number average molecular weight of 5,100 as determined by GPC (mobile phase: chloroform; expressed in terms of polystyrene equivalent) with a molecular weight distribution of 1.29. The average number of hydroxyl groups per polymer molecule was 2.4 as determined by $^1$H-NMR analysis.

Synthesis of a Crosslinkable Silyl-Terminated Poly(n-butyl Acrylate)

The hydroxyl-terminated poly(n-butyl acrylate) synthesized in the above manner (4.94 g, OH 2.30 mmol) was subjected to azeotropic dehydration at 50° C. in the presence of toluene. Thereto were added tin octylate (4.9 mg) and toluene (6 mL), and methyldimethoxysilylpropyl isocyanate (0.524 g, 2.77 mmol) was added dropwise at 50° C. Thereafter, the reaction temperature was raised to 70° C. and the reaction was further allowed to proceed for 4 hours. Based on the disappearance of a hydroxyl-bound methylene signal (3.8 ppm) in $^1$H-NMR analysis, it was judged that no unreacted hydroxyl groups remained. The volatile matter was distilled off under reduced pressure to give a crosslinkable silyl-terminated poly(n-butyl acrylate). This polymer had a viscosity of 22 Pa·s and a number average molecular weight of 4,900 as determined by GPC (mobile phase: chloroform; expressed in terms of polystyrene equivalent) with a molecular weight distribution of 1.60.

EXAMPLE 1

The crosslinkable silyl-terminated polymer (100 weight parts) synthesized in Synthesis Example 1 was mixed up with 1 weight parts of dibutyltin diacetylacetonate, and the mixture was poured into a mold and deaerated at room temperature using a vacuum drier. After 20 hours of heating at 50° C. for curing, a uniform rubber-like cured sheet was obtained. The gel fraction determined by toluene extraction was 93%.

Dumbbell test specimens No. 2(1/3) were punched out from 10 the rubber-like cured sheet and subjected to tensile testing (200 mm/min) using an autograph. The breaking strength was 0.31 MPa and the breaking extension was 35%.

SYNTHESIS EXAMPLE 2
Synthesis of an Alkenyl-Terminated Poly(n-butyl Acrylate)

In a nitrogen atmosphere at 75° C., undecenoyl chloride (7.22 mL, 6.81 g, 33.6 mmol) was slowly added dropwise to a toluene solution (100 mL) containing the hydroxyl-terminated poly(n-butyl acrylate) (50 g) obtained in Synthesis Example 1 and pyridine (10 mL), and the mixture was stirred at 75° C. for 3 hours. The white solid formed was filtered off, and the organic layer was washed with dilute hydrochloric acid and brine and dried over $Na_2SO_4$. Concentration under reduced pressure gave an alkenyl-terminated poly(n-butyl acrylate) (43 g). This polymer had a number average molecular weight of 5,400 as determined by GPC (mobile phase: chloroform; expressed in terms of polystyrene equivalent) with a molecular weight distribution of 1.30. The number of alkenyl groups introduced per polymer molecule was 2.3 as determined by $^1$H-NMR analysis.

Synthesis of a Crosslinkable Silyl-Terminated Poly(n-butyl Acrylate)

A 30-mL pressure reaction vessel was charged with the alkenyl-terminated poly(n-butyl acrylate) (2 g) obtained in the above manner, methyldimethoxysilane (0.32 mL), methyl orthoformate (0.09 mL, 3 equivalents relative to the alkenyl group) and platinum(0)-1,1,3,3-tetramethyl-1,3-divinyldisiloxane complex ($8.3 \times 10^{-8}$ mol/L solution in xylene, $10^{-4}$ equivalents relative to the alkenyl group), and the mixture was stirred at 100° C. for 1 hour. Removal of the volatile matter by distillation under reduced pressure gave 2 g of a crosslinkable silyl-terminated poly(n-butyl acrylate). The polymer had a number average molecular weight of 5,900 as determined by GPC (mobile phase: chloroform; expressed in terms of polystyrene equivalent) with a molecular weight distribution of 1.37. The number of crosslinkable silyl groups introduced per polymer molecule was 2.2 as determined by $^1$H-NMR analysis.

EXAMPLE 2

The crosslinkable silyl-terminated polymer (1 g) obtained in Synthesis Example 2 was mixed up with a curing catalyst [U-220 (trademark); product of Nitto Kasei; dibutyltin diacetylacetonate; 30 mg], and the mixture was poured into a mold, deaerated at room temperature using a vacuum drier, and allowed to stand at room temperature for 7 days, whereupon a uniform rubber-like cured product was obtained. The gel fraction was 78%.

EXAMPLE 3

The crosslinkable silyl-terminated polymer (100 weight parts) of Synthesis Example 2 was mixed up with 1 weight part of water and 1 weight part of dibutyltin dimethoxide, and the mixture was poured into a mold and deaerated at room temperature using a vacuum drier, followed by 20 hours of heating at 50° C. for curing, which gave a uniform rubber-like cured sheet. The gel fraction determined by toluene extraction was 88%.

Dumbbell test specimens No. 2(1/3) were punched out from the rubber-like cured sheet and subjected to tensile testing (200 mm/min) using an autograph. The breaking strength was 0.32 MPa and the breaking extension was 34%.

SYNTHESIS EXAMPLE 3

Synthesis of a Halogen-Terminated Poly(n-butyl Acrylate)

A 500-mL pressure reaction vessel was charged with n-butyl acrylate (112 mL, 100 g, 0.78 mol), dibromoxylene (4.12 g, 15.6 mmol), cuprous bromide (2.24 g, 15.6 mmol), 2,2'-bipyridyl (4.87 g, 31.2 mmol), ethyl acetate (90 mL) and acetonitrile (20 mL), the dissolved oxygen was removed by bubbling with nitrogen, and the vessel was sealed. The mixture was heated to 130° C. and the reaction was allowed to proceed for 2 hours. The reaction vessel was cooled to room temperature, 2-hydroxyethyl methacrylate (3.92 mL, 4.06 g, 31.2 mmol) was added, and the reaction was allowed to proceed at 110° C. for 2 hours. The mixture was diluted with ethyl acetate (200 mL), the insoluble matter was filtered off, 2.24 g of cuprous bromide (15.6 mmol), 0.76 g of pentamethyldiethylenetriamine (4.4 mmol), 5 mL of acetonitrile, 1.6 g of diethyl 2,5-dibromoadipate (4.4 mmol) and 44.7 g of butyl acrylate (349 mmol) were then added and, after deaeration by freezing, the reaction was allowed to proceed in a nitrogen atmosphere at 70° C. for 7 hours. Purification by removing the copper catalyst by passing the reaction mixture through an activated alumina column gave a bromine-terminated polymer. The polymer obtained had a number average molecular weight of 5,700 as determined by GPC (mobile phase: chloroform; expressed in terms of polystyrene equivalent) with a molecular weight distribution of 1.37.

Synthesis of an Alkenyl-Terminated Poly(n-butyl Acrylate)

In a nitrogen atmosphere, a 500-mL flask was charged with 84 g of the above halogen-terminated poly(n-butyl acrylate), 7.7 g of potassium pentenoate (56 mmol) and 80 mL of DMAc and the reaction was allowed to proceed at 70° C. for 4 hours. The unreacted portion of potassium pentenoate and the byproduct potassium bromide were removed from the reaction mixture by extractive purification with water, to give an alkenyl-terminated polymer. This polymer (70 g) and an equal amount of aluminum silicate [Kyowaad 700 PEL (trademark); product of Kyowa Chemical] were mixed together in toluene, and the mixture was stirred at 100° C. Four hours later, the aluminum silicate was filtered off, and the polymer was purified by distilling off the volatile matter by heating under reduced pressure. The polymer obtained had a number average molecular weight of 4,760 as determined by GPC (mobile phase: chloroform; expressed in terms of polystyrene equivalent) with a molecular weight distribution of 1.73. The number of alkenyl groups per polymer molecule as determined by $^1$H-NMR was 1.78.

Synthesis of a Crosslinkable Silyl-Terminated Poly(n-butyl Acrylate)

A 200-mL pressure reaction vessel was charged with the alkenyl-terminated polymer (60 g) obtained in the above manner, 8.4 mL of methyldimethoxysilane (68.1 mmol), 2.5 mL of methyl orthoformate (22.9 mmol) and $5 \times 10^{-3}$ mmol of platinum-bis(divinyltetramethyldisiloxane), and the reaction was allowed to proceed at 100° C. for 4 hours, to give a crosslinkable silyl-terminated polymer. The polymer obtained had a number average molecular weight of 6,010 as determined by GPC (mobile phase: chloroform; expressed in terms of polystyrene equivalent) with a molecular weight distribution of 1.44. The number of crosslinkable silyl groups per polymer molecule as determined by $^1$H-NMR was 1.59.

EXAMPLE 4

The crosslinkable silyl-terminated polymer (100 weight parts) obtained in Synthesis Example 3 was mixed up with 1 weight part of water and 1 weight part of dibutyltin dimethoxide with stirring, and the mixture was poured into a 2-mm-thick mold. Deaeration at room temperature using a vacuum drier, followed by 2 days of heating at 50° C. for curing, gave a uniform rubber-like cured sheet. The gel fraction determined by toluene extraction was 93%.

Dumbbell test specimens No. 2(1/3) were punched out from the rubber-like cured sheet and subjected to tensile testing (200 mm/min) using an autograph. The breaking strength was 0.26 MPa and the breaking extension was 75%.

SYNTHESIS EXAMPLE 4

Synthesis of a Halogen-Terminated Poly(n-butyl Acrylate)

A 50-mL flask was charged with 0.63 g of cuprous bromide (4.4 mmol), 0.76 g of pentamethyldiethylenetriamine (4.4 mmol), 5 mL of acetonitrile, 1.6 g of diethyl 2,5-dibromoadipate (4.4 mmol) and 44.7 g of butyl acrylate (349 mmol) and, after deaeration by freezing, the reaction was allowed to proceed in a nitrogen atmosphere at 70° C. for 7 hours. The reaction mixture was passed through an activated alumina column for removing the copper catalyst for purification, to give a bromine-terminated polymer. The polymer obtained had a number average molecular weight of 10,700 as determined by GPC (mobile phase: chloroform; expressed in terms of polystyrene equivalent) with a molecular weight distribution of 1.15.

Synthesis of an Alkenyl-Terminated Poly(n-butyl Acrylate)

In a nitrogen atmosphere, a 200-mL flask was charged with 35 g of the halogen-terminated poly(n-butyl acrylate) obtained in the above manner, 2.2 g of potassium pentenoate (16.1 mmol) and DMAc (35 mL), and the reaction was allowed to proceed at 70° C. for 4 hours. The unreaction portion of potassium pentenoate and the byproduct potassium bromide were removed from the reaction mixture by extractive purification with water, to give an alkenyl-terminated polymer. The polymer obtained had a number average molecular weight of 11,300 as determined by GPC (mobile phase: chloroform; expressed in terms of polystyrene equivalent) with a molecular weight distribution of 1.12. The number of alkenyl groups per polymer molecule as determined by $^1$H-NMR was 1.82.

Synthesis of a Crosslinkable Silyl-Terminated Poly(n-butyl Acrylate)

A 200-mL pressure reaction vessel was charged with 15 g of the alkenyl-terminated polymer obtained in the above manner, 1.8 mL of methyldimethoxysilane (14.5 mmol), 0.26 mL of methyl orthoformate (2.4 mmol) and platinum-bis(divinyltetramethyldisiloxane) ($10^{-4}$ mmol), and the reaction was allowed to proceed at 100° C. for 4 hours, to give a crosslinkable silyl-terminated polymer. The polymer obtained had a viscosity of 44 Pa·s and a number average molecular weight of 11,900 as determined by GPC (mobile phase: chloroform; expressed in terms of polystyrene equivalent) with a molecular weight distribution of 1.12. The number of crosslinkable silyl groups per polymer molecule as determined by $^1$H-NMR was 1.46.

EXAMPLE 5

The crosslinkable silyl-terminated polymer obtained in Synthesis Example 4 (100 weight parts) was mixed up with 1 weight part of water and 1 weight part of dibutyltin dimethoxide with stirring and the mixture was poured into a 2-mm-thick mold. Deaeration at room temperature using a vacuum drier, followed by 10 days of heating at 50° C. for curing, gave a uniform rubber-like cured sheet. The gel fraction determined by toluene extraction was 98%.

Dumbbell test specimens No. 2(1/3) were punched out from the rubber-like cured sheet and subjected to tensile testing (200 mm/min) using an autograph. The breaking strength was 0.35 MPa and the breaking extension was 77%.

SYNTHESIS EXAMPLE 5
Synthesis of an Alkenyl-Terminated Poly(n-butyl Acrylate)

A 100-mL glass reaction vessel was charged with butyl acrylate (50.0 mL, 44.7 g, 0.349 mol), cuprous bromide (1.25 g, 8.72 mmol), pentamethyldiethylenetriamine (1.82 mL, 1.51 g, 8.72 mmol) and acetonitrile (5 mL) and, after cooling and deaeration under vacuum, the vessel was purged with nitrogen gas. After thorough stirring, diethyl 2,5-dibromoadipate (1.57 g, 4.36 mmol) was added, and the mixture was stirred at 70° C. After 60 minutes of stirring, 1,7-octadiene (6.44 mL, 4.80 g, 43.6 mmol) was added, and heating was continued at 70° C. with stirring for 2 hours. The mixture was treated with activated alumina and the volatile matter was then distilled off under reduced pressure. The remaining product was dissolved in ethyl acetate and the solution was washed with 2% hydrochloric acid and brine. The organic layer was dried over $Na_2SO_4$ and the volatile matter was distilled off by heating under reduced pressure to give an alkenyl-terminated polymer. The polymer obtained had a number average molecular weight of 13,100 (expressed in terms of polystyrene equivalent) as determined by GPC, with a molecular weight distribution of 1.22. The degree of olefinic functional group introduction on the number average molecular weight basis was 2.01.

Synthesis of a Crosslinkable Silyl-Terminated Poly(n-butyl Acrylate)

The alkenyl-terminated poly(n-butyl acrylate) (30.5 g) obtained in the above manner was blended with an equal amount of aluminum silicate [Kyowaad 700 PEL (trademark); product of Kyowa Chemical] in toluene, and the mixture was stirred at 100° C. Four hours later, the aluminum silicate was filtered off and the polymer was purified by distilling off the volatile matter from the filtrate by heating under reduced pressure.

A 200-mL glass-made pressure reaction vessel was charged with the above purified polymer (23.3 g), dimethoxymethylsilane (2.55 mL, 20.7 mmol), dimethyl orthoformate (0.38 mL, 3.45 mmol) and the platinum catalyst. The platinum catalyst was used in a mole ratio of $2 \times 10^{-4}$ equivalents relative to the alkenyl group in the polymer. The reaction mixture was heated at 100° C. for 3 hours. The volatile matter was distilled off under reduced pressure from the mixture to give a crosslinkable silyl-terminated poly(n-butyl acrylate). The polymer obtained had a number average molecular weight of 13,900 as determined by GPC (mobile phase: chloroform; expressed in terms of polystyrene equivalent) with a molecular weight distribution of 1.25. The number of crosslinkable silyl groups per polymer molecule as determined by $^1$H-NMR was 1.58.

EXAMPLE 6

The crosslinkable silyl-terminated polymer (100 weight parts) obtained in Synthesis Example 5 was blended with 1 weight part of water and 1 weight part of dibutyltin dimethoxide with stirring, and the mixture was poured into a 2-mm-thick mold. Deaeration at room temperature using a vacuum drier and the subsequent 10 days of heating at 50° C. for curing gave a uniform rubber-like cured sheet. The gel fraction determined by toluene extraction was 85%.

Dumbbell test specimens No. 2(1/3) were punched out from the rubber-like cured sheet and subjected to tensile testing (200 mm/min) using an autograph. The breaking strength was 0.34 MPa and the breaking extension was 86%.

SYNTHESIS EXAMPLE 6
Synthesis of a Halogen-Terminated Poly(n-butyl Acrylate)

A 50-mL flask was charged with 0.63 g of cuprous bromide (4.4 mmol), 0.76 g of pentamethyldiethylenetriamine (4.4 mmol), 5 mL of acetonitrile, 0.78 g of diethyl 2,5-dibromoadipate (2.2 mmol) and 44.7 g of butyl acrylate (349 mmol) and, after deaeration by freezing, the reaction was allowed to proceed in a nitrogen atmosphere at 70° C. for 6 hours. Purification by passing the reaction mixture through an activated alumina column to remove the copper catalyst gave a bromine-terminated polymer. The polymer obtained had a number average molecular weight of 23,600 as determined by GPC (mobile phase: chloroform; expressed in terms of polystyrene equivalent) with a molecular weight distribution of 1.14.

Synthesis of an Alkenyl-Terminated Poly(n-butyl Acrylate)

In a nitrogen atmosphere, a 200-mL flask was charged with 34 g of the halogen-terminated poly(n-butyl acrylate) obtained in Synthesis Example 6, 1.0 g of potassium pentenoate (7.6 mmol) and 34 mL of DMAc, and the reaction was allowed to proceed at 70° C. for 4 hours. The unreacted portion of potassium pentenoate and the byproduct potassium bromide were removed from the reaction mixture by extractive purification with water, to give an alkenyl-terminated polymer. This alkenyl-terminated polymer and an equal amount (30.5 g) of aluminum silicate [Kyowaad 700 PEL (trademark); product of Kyowa Chemical] were mixed together in toluene, and the mixture was stirred at 100° C. Four hours later, the aluminum silicate was filtered off and the polymer was purified by distilling off the volatile matter from the filtrate by heating under reduced pressure. The polymer obtained had a number average molecular weight of 24,800 as determined by GPC (mobile phase: chloroform; expressed in terms of polystyrene equivalent) with a molecular weight distribution of 1.14. The number of alkenyl groups per polymer molecule was 1.46 as determined by $^1$H-NMR.

Synthesis of a Crosslinkable Silyl-Terminated Poly(n-butyl Acrylate)

A 200-mL pressure reaction tube was charged with 21 g of the alkenyl-terminated polymer obtained in the above manner, 0.94 mL of methyldimethoxysilane (7.6 mmol), 0.13 mL of methyl orthoformate (1.3 mmol) and $2 \times 10^{-4}$ mmol of platinum-bis(divinyltetramethyldisiloxane, and the reaction was allowed to proceed at 100° C. for 4 hours, to give a crosslinkable silyl-terminated polymer. The polymer obtained had a viscosity of 100 Pa·s and a number average molecular weight of 25,400 as determined by GPC (mobile phase: chloroform; expressed in terms of polystyrene equivalent) with a molecular weight distribution of 1.16. The number of crosslinkable silyl groups per polymer molecule was 1.48 as determined by $^1$H-NMR.

EXAMPLE 7

The crosslinkable silyl-terminated polymer (100 weight parts) obtained in Synthesis Example 6 was blended with 1 weight part of water and 1 weight part of dibutyltin dimethoxide with stirring, and the mixture was poured into a 2-mm-thick mold. Deaeration at room temperature using a vacuum drier and the subsequent 2 days of heating at 50° C. for curing gave a uniform rubber-like cured sheet. The gel fraction was 94% as determined by toluene extraction.

Dumbbell test specimens No. 2(1/3) were punched out from the rubber-like cured sheet and subjected to tensile testing (200 mm/min) using an autograph. The breaking strength was 0.40 MPa and the breaking extension was 323%.

COMPARATIVE SYNTHESIS EXAMPLE 1
Synthesis of a Hydroxyl-Terminated Poly(n-butyl Acrylate) Using a Hydroxyl-Containing Disulfide According to Example 1 of Japanese Kokai Publication Hei-5-262808, a 100-mL flask was charged with 2-hydroxyethyl disulfide (30.8 g, 0.2 mol). The flask was heated to 100° C., and a mixture of n-butyl acrylate (12.8 g, 0.1 mol) and AIBN (0.328 g, 0.002 mol) were added dropwise over 30 minutes. The mixture was further stirred at 100° C. for 1 hour. Toluene (20 mL) was added, the mixture was allowed to stand in a separating funnel, and the lower layer was separated. The upper layer was washed with three portions of water and dried over $Na_2SO_4$, and the volatile matter was distilled off under reduced pressure, to give a hydroxyl-terminated poly(n-butyl acrylate) (12.2 g, 95%). This polymer had a viscosity of 49 Pa·s and a number average molecular weight of 4,200 as determined by GPC (mobile phase: chloroform, expressed in terms of polystyrene equivalent) with a molecular weight distribution of 4.16.

Synthesis of a Crosslinkable Silyl-Containing Poly(n-butyl Acrylate) Using a Hydroxyl-Containing Disulfide The hydroxyl-terminated poly(n-butyl acrylate) (4.52 g, OH=1.85 mmol) synthesized in the above manner was subjected to azeotropic dehydration at 50° C. in the presence of toluene. Thereto were added tin octylate (4.52 mg) and toluene (6 mL), and methyldimethoxysilylpropyl isocyanate (0.421 g, 2.22 mmol) was added dropwise at 50° C. Thereafter, the reaction temperature was raised to 70° C. and the reaction was allowed to proceed continuedly for 4 hours. Based on the disappearance of a hydroxyl-bound methylene signal (3.8 ppm) in $^1$H-NMR, it was judged that no unreacted hydroxyl group remained. The volatile matter was distilled off under reduced pressure to give a crosslinkable silyl-terminated poly(n-butyl acrylate). This polymer had a viscosity of 53 Pa·s and a number average molecular weight of 4,700 as determined by GPC (mobile phase: chloroform; expressed in terms of polystyrene equivalent) with a molecular weight distribution of 3.71.

COMPARATIVE EXAMPLE 1

The crosslinkable silyl-terminated polymer (100 weight parts) of Comparative Example 1 was mixed up with 1 weight part of dibutyltin diacetylacetonate, and the mixture was poured into a mold and deaerated at room temperature using a vacuum drier. Heating at 50° C. for 20 hours for curing gave a uniform rubber-like cured sheet. The gel fraction determined by toluene extraction was 82%. The extract fraction was concentrated and the concentrate was subjected to $^1$H-NMR; no crosslinkable silyl group was found therein.

Dumbbell test specimens No. 2(1/3) were punched out from the rubber-like cured sheet and subjected to tensile testing (200 mm/min) using an autograph. The breaking strength was 0.21 MPa and the breaking extension was 93%.

COMPARATIVE SYNTHESIS EXAMPLE 2
Synthesis of a Crosslinkable Silyl-Containing Poly(n-butyl Acrylate) Using a Crosslinkable Silyl-Containing Monomer In a one-liter flask, 385 g of butyl acrylate and 15 g of methyldimethoxysilylpropyl methacrylate were polymerized in 400 g of toluene in the presence of 6 g of azobisisobutyronitrile at 105° C. for 7 hours with bubbling with nitrogen. Then, the toluene was distilled off to give a crosslinkable silyl-containing poly(n-butyl acrylate). This polymer had a viscosity of 74 Pa·s and a number average molecular weight of 8,500 as determined by GPC (mobile phase: chloroform; expressed in terms of polystyrene equivalent) with a molecular weight distribution of 2.47. The average number of hydroxyl groups per polymer molecule was 1.40 as determined by $^1$H-NMR analysis.

COMPARATIVE EXAMPLE 2

The crosslinkable silyl-containing polymer (100 weight parts) of Comparative Synthesis Example 2 was blended with 1 weight part of water and 1 weight part of dibutyltin dimethoxide with stirring, and the mixture was poured into a 2-mm-thick mold and deaerated at room temperature using a vacuum drier. Upon heating at 50° C. for 10 days for curing, a uniform rubber-like cured sheet was obtained. The gel fraction was 78% as determined by toluene extraction.

Dumbbell test specimens No. 2(1/3) were punched out from the rubber-like cured sheet and subjected to tensile testing (200 mm/min) using an autograph. The breaking strength was 0.14 MPa and the breaking extension was 69%.

COMPARATIVE SYNTHESIS EXAMPLE 3
Synthesis of a Crosslinkable Silyl-Containing Poly(n-butyl Acrylate) Using a Crosslinkable Silyl-Containing Monomer In a one-liter flask, 293 g of butyl acrylate and 7.2 g of methyldimethoxysilylpropyl methacrylate were polymerized in 210 g of toluene in the presence of 1.8 g of azobisisovaleronitrile at 105° C. for 7 hours with bubbling with nitrogen. Then, the toluene was distilled off to give a crosslinkable silyl-containing poly(n-butyl acrylate). This polymer had a viscosity of 110 Pa·s and a number average molecular weight of 9,600 as determined by GPC (mobile phase: chloroform; expressed in terms of polystyrene equivalent) with a molecular weight distribution of 2.86.

The results obtained in Examples 1 to 7 except for Example 2 and of Comparative Examples 1 and 2 and Comparative Synthesis Example 3 are shown below in Table 1.

TABLE 1

|  | Ex. 1 | Ex. 3 | Ex. 4 | Ex. 5 | Ex. 6 | Ex. 7 | Compar. Ex. 1 | Compar. Ex. 2 | — |
|---|---|---|---|---|---|---|---|---|---|
|  |  |  |  |  | Polymer |  |  |  |  |
|  | Synthesis Ex. 1 | Synthesis Ex. 2 | Synthesis Ex. 3 | Synthesis Ex. 4 | Synthesis Ex. 5 | Synthesis Ex. 6 | Compar. Synthesis Ex. 1 | Compar. Synthesis Ex. 2 | Compar. Synthesis Ex. 3 |
| Viscosity (Pa*s) | 22 | — | — | 44 | — | 100 | 53 | 74 | 110 |
| Mn | 4900 | 5900 | 6900 | 11900 | 13900 | 25400 | 4700 | 8500 | 9600 |
| Mw/Mn | 1.60 | 1.37 | 1.44 | 1.12 | 1.25 | 1.16 | 3.71 | 2.47 | 2.86 |
| Fn | 2.39 | 2.24 | 1.59 | 1.46 | 1.58 | 1.48 | 1.42 | 1.40 | — |
| Gel fraction (%) | 93 | 88 | 93 | 98 | 85 | 94 | 82 | 78 | — |

TABLE 1-continued

|  | Ex. 1 | Ex. 3 | Ex. 4 | Ex. 5 | Ex. 6 | Ex. 7 | Compar. Ex. 1 | Compar. Ex. 2 | — |
|---|---|---|---|---|---|---|---|---|---|
|  |  |  |  |  | Polymer |  |  |  |  |
|  | Synthesis Ex. 1 | Synthesis Ex. 2 | Synthesis Ex. 3 | Synthesis Ex. 4 | Synthesis Ex. 5 | Synthesis Ex. 6 | Compar. Synthesis Ex. 1 | Compar. Synthesis Ex. 2 | Compar. Synthesis Ex. 3 |
| Breaking strength (Mpa) | 0.31 | 0.32 | 0.26 | 0.35 | 0.34 | 0.40 | 0.21 | 0.14 | — |
| Breaking extention (%) | 35 | 34 | 75 | 77 | 86 | 323 | 93 | 69 | — |

Fn: Average number of crosslinking silyl groups per molecule.

The crosslinkable silyl-containing vinyl polymers of the present invention have a narrow molecular weight distribution, hence have a very low viscosity as compared with the polymers of the comparative synthesis examples which are roughly comparable in molecular weight, and are superior in handling properties (for example, the viscosity of the product of Synthesis Example 1 is not more than half of that of the product of Comparative Synthesis Example 1; the same is true for the comparison between Synthesis Example 4 and Comparative Synthesis Example 3). When the viscosity the polymer should have is roughly specified, the polymer can be synthesized so as to have a higher molecular weight, hence can provide cured products having a better balance between strength and elongation (as seen, for example, in Synthesis Example 6). Furthermore, since the crosslinkable silyl-containing vinyl polymer is synthesized by living radical polymerization, the amount of polymer molecules containing no crosslinkable silyl group in said polymer is smaller even when the content of the crosslinkable silyl group per molecule is roughly identical to that in prior art polymers; as a result, cured products higher in gel fraction can be obtained (Example 5 versus Comparative Example 1).

EXAMPLE 8

Heat Resistance of a Cured Product

A portion of the cured sheet obtained in Example 5 was placed in an oven maintained at 150° C. and, after the lapse of 24 hours, it was taken out and the surface condition was observed. No abnormality was found in the surface condition.

COMPARATIVE SYNTHESIS EXAMPLE 4

Synthesis of a Crosslinkable Silyl-Terminated Polydimethylsiloxane (Silicone)

A 200-mL flask was charged with 97 g of a vinyl-terminated polydimethylsiloxane [mol. wt. 17,200; DMS-V25 (trademark); product of Azumax; unsaturated group equivalent: 0.11 eq/kg], 2.3 g of methyldimethoxysilane (21.4 mmol) and $10^{-3}$ mmol of platinum-bis(divinyltetramethyldisiloxane), and the reaction was allowed to proceed at 70° C. for 6 hours. The thus-obtained, crosslinkable silyl-terminated polydimethylsiloxane had a number average molecular weight of 11,900 as determined by GPC (mobile phase: chloroform; expressed in terms of polystyrene equivalent) with a molecular weight distribution of 2.52. It was found by $^1$H-NMR that the unsaturated group-due peak had disappeared. The number of crosslinkable silyl groups per polydimethylsiloxane molecule was 2 as determined from the intensity ratio between the polymer chain silicon-bound methyl protons and the methoxysilyl protons. The viscosity was 6 poises.

COMPARATIVE EXAMPLE 3

Heat Resistance of a Cured Product

The crosslinkable silyl-containing polymer (100 weight parts) of Comparative Synthesis Example 4 was mixed up with 1 weight part of water and 1 weight part of dibutyltin dimethoxide with stirring, and the mixture was poured into a 2-mm-thick mold. After deaeration under reduced pressure, curing was effected by heating at 50° C. for 10 days. A portion of the cured sheet obtained was placed in an oven maintained at 150° C. and, after the lapse of 24 hours, it was taken out and the surface condition was checked. No abnormality was found on the surface.

COMPARATIVE SYNTHESIS EXAMPLE 5

Synthesis of Allyl-Terminated Polyisobutylene

A two-liter glass-made pressure polymerization vessel was purged with nitrogen and charged with 205 mL of molecular sieve-dried ethylcyclohexane, 819 mL of toluene and 2.89 g of p-dicumylchloride (12.5 mmol). Monomericisobutylene (332 mL, 3.91 mol) was introduced into the polymerization vessel and, then, 0.454 g of 2-methylpyridine (4.88 mmol) and 6.69 mL of titanium tetrachloride (61.0 mmol) were added to thereby initiate the polymerization. After the lapse of a reaction period of 70 minutes, 6.86 g of allyltrimethylsilane (60.0 mmol) was added for allyl group introducing into polymer termini. After the lapse of a reaction period of 120 minutes, the reaction mixture was washed with water and the solvent was distilled off to give allyl-terminated polyisobutylene.

Synthesis of a Crosslinkable Silyl-Terminated Polyisobutylene

The allyl-terminated polymer (200 g) obtained in the above manner was heated to about 75° C. and, then, methyldimethoxysilane (1.5 eq/vinyl group) and platinum-(vinylsiloxane) complex ($5 \times 10^{-5}$ eq/vinyl group) and the hydrosilylation reaction was allowed to proceed. The reaction was followed by FT-IR. The absorption of olefin at 1640 $cm^{-1}$ disappeared in about 20 hours.

The thus-obtained polyisobutylene polymer had a viscosity of 360 Pa·s and a number average molecular weight of 4,800 as determined by GPC (mobile phase: chloroform; expressed in terms of polystyrene equivalent) with a molecular weight distribution of 1.52. The number of crosslinkable silyl groups per polymer molecule was 1.66 as determined by $^1$H-NMR analysis.

COMPARATIVE EXAMPLE 4

Heat Resistance of a Cured Product

The crosslinkable silyl-containing polymer (100 weight parts) of Comparative Synthesis Example 5 was mixed up with 1 weight part of water and 1 weight part of dibutyltin dimethoxide with stirring, and the mixture was poured into a 2-mm-thick mold. After deaeration under reduced pressure, curing was effected by heating at 50° C. for 10 days. A portion of the cured product obtained was placed in an oven maintained at 150° C. and, after 24 hours, it was taken out and the surface condition was observed. The surface was found molten, with partial exudation.

The results obtained in Example 8 and Comparative Examples 3 and 4 are shown in Table 2.

TABLE 2

|  | Example 8 | Compar. Ex. 3 | Compar. Ex. 4 |
|---|---|---|---|
| Polymer | Poly(n-butyl acrylate) | Polydimethyl-siloxane | Polyisobutylene |
| Heat resistance of cured product | No abnormality | No abnormality | Surface melting |

The cured product from the crosslinkable silyl-containing vinyl polymer has the same level of heat resistance as that of silicone polymers and is superior in heat resistance to polyisobutylenes and, therefore, can be used in those fields in which heat resistance is required.

EXAMPLE 9

Accelerated Weathering Resistance

A portion of the cured product obtained in Example 5 was subjected to accelerated weathering resistance testing using a sunshine weather-o-meter, followed by surface condition observation. Even after the lapse of 1,000 hours, neither surface melting nor discoloration was observed.

COMPARATIVE EXAMPLES 5 AND 6

Accelerated Weathering Resistance

An accelerated weathering resistance test was performed in the same manner as in Example 9 except that, in Comparative Example 5, the silicone polymer obtained in Comparative Synthesis Example 4 was used in lieu of the cured sheet obtained in Example 5 and, in Comparative Example 6, the polyisobutylene polymer obtained in Comparative Synthesis Example 5 was used. In Comparative Example 5, even after the lapse of 1,000 hours, no surface melting or discoloration was observed. On the other hand, surface melting had begun after the lapse of 500 hours.

The crosslinkable silyl-containing vinyl polymer of the present invention has the same level of weathering resistance as that of silicone polymers and by far superior in weathering resistance to the polyisobutylene type polymers, so that it can be used in those fields in which weathering resistance is required.

EXAMPLE 10

One-Component Core Curability

The crosslinkable silyl-containing polymer (100 weight parts) obtained in Synthesis Example 5 was subjected to azeotropic dehydration using toluene. In a nitrogen atmosphere, 1 weight part of methyltrimethoxysilane and 1 weight part of dibutyltin diacetylacetonate were added in that order, and the mixture was stored in a tightly closed sample bottle as a one-component formulation. After one week of storage in a constant-temperature, constant-humidity room (23° C., 60% RH), the mixture was discharged into a sample tube. After 24 hours following discharge, the cured portion was taken out and the thickness thereof in the direction of depth was measured and found to be 3 mm.

COMPARATIVE EXAMPLES 7 AND 8

One-Component Core Curability

Core curability measurements were performed in the same manner as in Example 9 except that, in Comparative Example 7, the silicone polymer obtained in Comparative Synthesis Example 4 was used in lieu of the polymer obtained in Synthesis Example 5 and, in Comparative Example 8, the polyisobutylene polymer obtained in Comparative Synthesis Example 5 was used. In Comparative Example 7, the core curability was 3 mm. In Comparative Example 8, only a thin film was found on the surface and no curing was detected in the core.

The composition comprising the crosslinkable silyl-containing vinyl polymer of the present invention has the same level of one-component core curability as that of the silicone-based composition and is by far superior in one-component core curability to the polyisobutylene-based composition and, therefore, can be used as a one-component sealing composition.

EXAMPLES 11

Adhesiveness

To 100 weight parts of the crosslinkable silyl-containing poly(n-butyl acrylate) obtained in Synthesis Example 5 were added 120 weight parts of colloidal calcium carbonate, 50 weight parts of dioctyl phthalate, 2 weight parts of an amino-containing crosslinkable silyl-containing compound, A-1120 (trademark; product of Nippon Unicar) and 1 weight part of dibutyltin diacetylacetonate and, after thorough mixing, the mixture was processed into a bead form on a glass substrate. After 7 days of standing at room temperature, the adhesiveness was evaluated by making an interfacial incision and peeling off the beads. The brakage was found to be a cohesive failure of the cured composition.

The crosslinkable silyl-containing vinyl polymer of the present invention has a sufficient level of adhesiveness and can satisfactorily used as an adhesive curable composition.

EXAMPLE 12

Coatability

To 100 weight parts of the crosslinkable silyl-containing poly(n-butyl acrylate) obtained in Synthesis Example 5 were added 10 weight parts of titanium oxide, 100 weight parts of colloidal calcium carbonate, 40 weight parts of heavy calcium carbonate and the reaction product from 3 weight parts of tin octylate and 0.75 weight part of laurylamine. After thorough mixing, the mixture was processed into a sheet. On the next day following sheet making, an acrylic emulsion paint (Water-base Top, product of Nippon Paint) diluted with 10% of water was applied. Coating could be performed without problem.

COMPARATIVE EXAMPLE 9

Coatability

The same experiment as in Example 12 was made using the crosslinkable silyl-containing polydimethylsiloxane obtained in Comparative Synthesis Example 4 in lieu of the crosslinkable silyl-containing poly(n-butyl acrylate) obtained in Synthesis Example 5. Upon Application, the paint was immediately repelled.

Unlike the composition based on the silicone polymer, the composition comprising the crosslinkable silyl-containing vinyl polymer of the present invention had sufficient coatability. Therefore, the composition of the present invention can be used as a curable composition for providing a coatable sealing material.

EXAMPLE 13

Stain Resistance

To 100 weight parts of the crosslinkable silyl-containing poly(n-butyl acrylate) obtained in Synthesis Example 5 were added 10 weight parts of titanium oxide, 100 weight parts of colloidal calcium carbonate, 40 weight parts of heavy calcium carbonate and the reaction product from 3 weight parts of tin octylate and 0.75 weight part of laurylamine. After thorough mixing, the mixture was filled into the joint between granite pieces coated with a primer (No.40, product of Yokohama Rubber), followed by outdoor exposure. Even after the lapse of 8 months, the vicinity of the joint was clean.

COMPARATIVE EXAMPLE 10

Stain Resistance

The same experiment as in Example 13 was made using the crosslinkable silyl-containing polydimethylsiloxane obtained in Comparative Synthesis Example 4 in lieu of the crosslinkable silyl-containing poly(n-butyl acrylate) obtained in Synthesis Example 4. After the lapse of 8 months, the vicinity of the joint was stained gray.

Unlike the composition based on the silicone polymer, the composition comprising the crosslinkable silyl-containing vinyl polymer of the present invention did not stain the granite pieces. Therefore, it can be used as a nonstaining sealing material or a like curable composition.

EXAMPLE 14

Adhesive Composition

The crosslinkable silyl-containing poly(n-butyl acrylate) (100 weight parts) obtained according to the same formulation as employed in Synthesis Example 4 was mixed up with 175 weight parts of a 40% toluene solution of a special rosin ester [Super Ester A-100 (trademark); product of Arakawa Chemical Industries] and 2 weight parts of a tin catalyst [#918 (trademark; product of Sankyo Organic] and the mixture was applied to a PET film using a 100-m coater. After one day of standing at room temperature, the coating was heated at 50° C. for a day. According to JIS Z 0237, test specimens were prepared for a 180° peeling test and the adhesion was tested and found to be 4.5 N/25 mm.

From this result, it is seen that the crosslinkable silyl-containing vinyl polymer of the present invention can be used as an adhesive agent.

SYNTHESIS EXAMPLE 8

Synthesis of a Crosslinkable Silyl-Containing n-butyl Acrylate-Methyl Methacrylate Copolymer A 200-mL flask was charged with 1.4 g of cuprous bromide (9.8 mmol), 1.2 g pentamethyldiethylenetriamine (6.7 mmol), acetonitrile (20 mL), butyl acetate (80 mL), 4.4 g of diethyl 2,5-dibromoadipate (12.2 mmol), 25.0 g of butyl acrylate (195 mmol), 68.4 g of methyl methacrylate (684 mmol) and 5.7 g of methyldimethoxysilylpropyl methacrylate (24.4 mmol). After deaeration by freezing, the reaction was allowed to proceed in a nitrogen atmosphere at 70° C. for 7 hours. The reaction mixture was passed through an activated alumina column to thereby remove the copper catalyst for purification, to give a crosslinkable silyl-containing n-butyl acrylate/methyl methacrylate copolymer. The polymer obtained had a number average molecular weight of 12,500 as determined by GPC (mobile phase: chloroform; expressed in terms of polystyrene equivalent) with a molecular weight distribution of 1.55. The viscosity of a 65% toluene solution of the copolymer obtained was 10 Pa·s.

EXAMPLE 15

To 100 weight parts (as solids) of the copolymer obtained in Synthesis Example 8 was added 1 weight part of a tin-based curing catalyst [#918 (trademark); product of Sankyo Organic], and the mixture was applied to a steel sheet and a teflon sheet using a 150-$\mu$m coater. The coating formed on the steel sheet was allowed to stand at room temperature for 2 days and then the 60° mirror reflectance was measured and found to be 96. The coating formed on the teflon sheet was matured at room temperature for 1 day and then at 50° C. for 3 days. The coating piece was placed on a wire gauze and immersed in toluene for 1 day and then dried at 80° C. under reduced pressure for 4 hours. The thus-determined gel fraction was 86%.

COMPARATIVE SYNTHESIS EXAMPLE 6

Synthesis of a Crosslinkable Silyl-Containing n-butyl Acrylate-Methyl Methacrylate Copolymer A mixture of toluene (800 g), butyl acrylate (208 g), methyl methacrylate (552 g), methyldimethoxysilylpropyl methacrylate (40 g) and azobisisobutyronitrile (24 g) in a two-liter flask was subjected to polymerization at 105° C. for 7 hours while bubbling with nitrogen. The thus-obtained, crosslinkable silyl-containing n-butyl acrylate/methyl methacrylate copolymer has a number average molecular weight of 7,400 as determined by GPC (mobile phase: chloroform; expressed in terms of polystyrene equivalent) with a molecular weight distribution of 1.87. A 69% toluene solution of the copolymer obtained had a viscosity of 10 Pa·s.

COMPARATIVE EXAMPLE 11

In the same manner as in Example 15, 1 weight part of a tin-based curing catalyst [#918 (trademark); product of Sankyo Organic] was added to 100 weight parts (as solids) of the copolymer obtained in Comparative Synthesis Example 6 and the mixture was applied to a steel sheet and a teflon sheet using a 150-m coater. The coating formed on the steel sheet was allowed to stand at room temperature for 2 days and then the 600 mirror reflectance was measured and found to be 96. The coating formed on the teflon sheet was matured at room temperature for 1 day and then at 50° C. for 3 days. The coating piece was placed on a wire gauze and immersed in toluene for 1 day and then dried at 80° C. under reduced pressure for 4 hours. The thus-determined gel fraction was 71%.

The crosslinkable silyl-containing vinyl polymer of the present invention has a narrow molecular weight, so that even when it has a high molecular weight, the viscosity increase is slight and a high solid content composition can be prepared. At the same time, a paint composition giving a high gel fraction and a high level of gloss can be obtained.

INDUSTRIAL APPLICABILITY

The composition of the present invention is excellent in weathering resistance and heat resistance and low in viscosity. Therefore, it can be used in a sealing composition which is easy to handle and capable of being packed as a one-component formulation and has good coatability. Because of its good weathering resistance and heat resistance and low viscosity, it can also be used in a paint composition or pressure sensitive adhesive composition which has a high solid content and is less unfriendly to the environment.

What is claimed is:

1. A method for reducing viscosity of an adhesive curable composition comprising a vinyl polymer having at least one crosslinkable silyl group represented by the general formula (1):

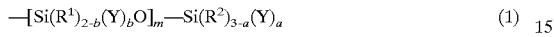

wherein each $R^1$ and $R^2$ represents an alkyl group containing 1 to 20 carbon atoms, an aryl group containing 6 to 20 carbon atoms, an aralkyl group containing 7 to 20 carbon atoms or a triorganosiloxy group represented by the formula $(R')_3SiO-$ wherein $R'$ represents a monovalent hydrocarbon group containing 1 to 20 carbon atoms and the plural $R'$ groups may be the same or different and, when there are two or more $R^1$ or $R^2$ groups, they may be the same or different; Y represents a hydroxyl group or a hydrolyzable group and, when there are two or more Y groups, they may be the same or different; a represents 0, 1, 2 or 3; b represents 0, 1 or 2; and m represents an integer of 0 to 19; with the condition that a, b and m satisfy the relation $a+mb \geq 1$, comprising adjusting a weight average molecular weight-to-number average molecular weight ratio of said vinyl polymer to less than 1.8 as determined by permeation chromatography.

2. A method for reducing a solvent content in an adhesive curable composition comprising a solvent and a vinyl polymer having at least one crosslinkable silyl group represented by the general formula (1) as compared to a solvent content of a composition having the same viscosity and comprising a solvent and a polymer having a molecular weight distribution of at least 1.8:

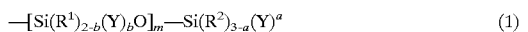

wherein each $R^1$ and $R^2$ represents an alkyl group containing 1 to 20 carbon atoms, an aryl group containing 6 to 20 carbon atoms, an aralkyl group containing 7 to 20 carbon atoms or a triorganosiloxy group represented by the formula $(R')_3SiO-$ wherein $R'$ represents a monovalent hydrocarbon group containing to 1 to 20 carbon atoms and the plural $R'$ groups may be the same or different and, when there are two or more $R^1$ or $R^2$ groups, they may be the same or different; Y represents a hydroxyl group or a hydrolyzable group and, when there are two or more Y groups, they may be the same or different; a represents 0, 1, 2 or 3; b represents 0, 1 or 2; and m represents an integer of 0 to 19; with the condition that a, b and m satisfy the relation $a+mb \geq 1$, comprising adjusting a weight average molecular weight-to-number average molecular weight ratio of said vinyl polymer to less than 1.8 as determined by gel permeation chromatography.

3. The method according to claim 1, wherein the adhesive curable composition comprises 0.01 to 20 parts by weight of an adhesion promoter, relative to 100 parts by weight of said vinyl polymer.

4. The method according to claim 1, wherein the vinyl polymer is a (meth)acrylic polymer.

5. The method according to claim 1, wherein the vinyl polymer is produced by living radical polymerization.

6. The method according to claim 1, wherein the vinyl polymer is produced by atom transfer radical polymerization.

7. The method according to claim 1, wherein said vinyl polymer has at least one crosslinkable silyl group represented by the general formula (1) at a molecular chain terminus.

8. The method according to claim 1, wherein the vinyl polymer having at least one crosslinkable silyl group represented by the general formula (1) is produced by the steps of:
   (1) subjecting a vinyl monomer to radical polymerization using an organic halide or halogenated sulfonyl compound as the initiator and a transition metal complex as the catalyst to produce a halogen-terminated vinyl polymer;
   (2) reacting said halogen-terminated vinyl polymer with an alkenyl-terminated vinyl polymer; and
   (3) reacting said alkenyl-terminated vinyl polymer with a hydrosilane compound having a crosslinkable silyl group represented by the general formula (1).

9. The method according to claim 1, wherein the vinyl polymer having at least one crosslinkable silyl group represented by the general formula (1) is produced by the steps of:
   (1) subjecting a vinyl monomer to living radical polymerization to produce a vinyl polymer; and
   (2) consecutively reacting said vinyl polymer of step (1) with a compound having at least two low-polymerizable alkenyl groups to produce an alkenyl-terminated vinyl polymer and reacting the terminal alkenyl group with a hydrosilane compound having a crosslinkable silyl group represented by the general formula (1) to thereby convert said alkenyl group of said vinyl polymer to a crosslinkable silyl-containing substituent.

10. The method according to claim 1, wherein the adhesive curable composition further comprises a compound having both a crosslinkable silyl group and an organic group having at least one atom selected from the group consisting of nitrogen, oxygen and sulfur atoms, as an adhesion promoter.

11. The method according to claim 1, wherein the adhesive curable composition is a sealing composition.

12. The method according to claim 11, wherein the sealing composition is packed as a one-component formulation so as to cure by crosslinking upon absorption of moisture.

13. The method according to claim 1, wherein the adhesive curable composition is a pressure sensitive adhesive composition.

14. The method according to claim 13, wherein the pressure sensitive adhesive composition further comprises a tackifier resin.

15. The method according to claim 1, wherein the adhesive curable composition is a coating composition.

16. The method according to claim 1, wherein the adhesive curable composition is a powder coating composition.

17. The method according to claim 2,
wherein the adhesive curable composition comprises 0.01 to 20 parts by weight of an adhesion promoter, relative to 100 parts by weight of said vinyl polymer.

18. The method according to claim 2,
wherein the vinyl polymer is a (meth)acrylic polymer.

19. The method according to claim 2,
wherein the vinyl polymer is produced by living radical polymerization.

20. The method according to claim 2,
wherein the vinyl polymer is produced by atom transfer radical polymerization.

21. The method according to claim 2,
wherein said vinyl polymer has at least one crosslinkable silyl group represented by the general formula (1) at a molecular chain terminus.

22. The method according to claim 2,
wherein the vinyl polymer having at least one crosslinkable silyl group represented by the general formula (1) is produced by the steps of:
  (1) subjecting a vinyl monomer to radical polymerization using an organic halide or halogenated sulfonyl compound as the initiator and a transition metal complex as the catalyst to produce a halogen-terminated vinyl polymer;
  (2) reacting said halogen-terminated vinyl polymer with an alkenyl-containing oxy anion to thereby effect substitution of the halogen to produce an alkenyl-terminated vinyl polymer; and
  (3) reacting said alkenyl-terminated vinyl polymer with a hydrosilane compound having a crosslinkable silyl group represented by the general formula (1).

23. The method according to claim 2,
wherein the vinyl polymer having at least one crosslinkable silyl group represented by the general formula (1) is produced by the steps of:
  (1) subjecting a vinyl monomer to living radical polymerization to produce a vinyl polymer; and
  (2) consecutively reacting said vinyl polymer of step (1) with a compound having at least two low-polymerizable alkenyl groups to produce an alkenyl-terminated vinyl polymer and reacting the terminal alkenyl group with a hydrosilane compound having a crosslinkable silyl group represented by the general formula (1) to thereby convert said alkenyl group of said vinyl polymer to a crosslinkable silyl-containing substituent.

24. The method according to claim 2,
wherein the adhesive curable composition further comprises a compound having both a crosslinkable silyl group and an organic group having at least one atom selected from the group consisting of nitrogen, oxygen and sulfur atoms, as an adhesion promoter.

25. The method according to claim 2,
wherein the adhesive curable composition is a sealing composition.

26. The method according to claim 25,
wherein the sealing composition is packed as a one-component formulation so as to cure by crosslinking upon absorption of moisture.

27. The method according to claim 2,
wherein the adhesive curable composition is a pressure sensitive adhesive composition.

28. The method according to claim 27,
wherein the pressure sensitive adhesive composition further comprises a tackifier resin.

29. The method according to claim 2,
wherein the adhesive curable composition is a coating composition.

30. The method according to claim 2,
wherein the adhesive curable composition is a powder coating composition.

\* \* \* \* \*

UNITED STATES PATENT AND TRADEMARK OFFICE
CERTIFICATE OF CORRECTION

PATENT NO. : 6,552,118 B2  Page 1 of 1
DATED : April 22, 2003
INVENTOR(S) : Masayuki Fujita et al.

It is certified that error appears in the above-identified patent and that said Letters Patent is hereby corrected as shown below:

Column 37,
Line 50, delete the word "to" (first occurrence).

Signed and Sealed this

Eleventh Day of November, 2003

JAMES E. ROGAN
*Director of the United States Patent and Trademark Office*